(12) United States Patent
Sinex

(10) Patent No.: US 6,671,593 B2
(45) Date of Patent: Dec. 30, 2003

(54) DYNAMIC AIRCRAFT MAINTENANCE PRODUCTION SYSTEM

(75) Inventor: Barry Sinex, Duluth, MN (US)

(73) Assignee: Sinex Holding LLC, Duluth, MN (US)

( * ) Notice: Subject to any disclaimer, the term of this patent is extended or adjusted under 35 U.S.C. 154(b) by 394 days.

(21) Appl. No.: 09/734,319

(22) Filed: Dec. 1, 2000

(65) Prior Publication Data

US 2001/0032110 A1 Oct. 18, 2001

Related U.S. Application Data

(60) Provisional application No. 60/168,400, filed on Dec. 1, 1999.

(51) Int. Cl.$^7$ ............................................. G08B 21/00
(52) U.S. Cl. ........................... 701/29; 340/853.2; 705/8; 705/14; 705/28; 702/184
(58) Field of Search .......................... 701/29, 30, 103, 701/204, 205, 31, 45, 32, 33, 34; 702/184; 705/7, 9, 4, 8, 28, 14; 340/349, 945, 971, 434, 500, 457, 531, 438; 395/614, 615

(56) References Cited

U.S. PATENT DOCUMENTS

| | | | | |
|---|---|---|---|---|
| 5,216,612 A | | 6/1993 | Cornett et al. ............... 364/468 |
| 5,239,468 A | * | 8/1993 | Sewersky et al. ........... 364/550 |
| 5,454,074 A | * | 9/1995 | Hartel et al. ................ 395/161 |
| 5,610,923 A | * | 3/1997 | Callay ......................... 371/5.1 |
| 5,778,381 A | | 7/1998 | Sandifer ...................... 707/104 |
| 5,828,969 A | | 10/1998 | Chamney et al. ............. 701/29 |
| 5,918,219 A | | 6/1999 | Isherwood .................... 705/37 |
| 5,931,877 A | * | 8/1999 | Smith et al. .................. 701/29 |
| 5,931,878 A | * | 8/1999 | Chapin, Jr. ................... 701/30 |
| 6,003,808 A | | 12/1999 | Nguyen et al. ............. 244/1 R |
| 6,006,171 A | | 12/1999 | Vines et al. ................ 702/184 |
| 6,067,486 A | * | 5/2000 | Aragones et al. .............. 701/29 |
| 6,092,102 A | | 7/2000 | Wagner ....................... 709/206 |
| 6,125,312 A | | 9/2000 | Nguyen et al. ................ 701/35 |
| 6,148,297 A | | 11/2000 | Swor et al. ....................... 70/3 |
| 6,150,959 A | | 11/2000 | Germanetti ................. 340/971 |
| 6,173,159 B1 | * | 1/2001 | Wright et al. ................. 455/66 |
| 6,246,341 B1 | * | 6/2001 | Germanetti ................. 340/946 |
| 6,400,282 B1 | * | 6/2002 | Germanetti ................. 340/971 |

OTHER PUBLICATIONS

"Flight Regulations", Army Publications and Printing Command, Sep. 4, 1997, section 2.*
"Approved Pilot Maintenance for Class B Aircraft", Civil Aviation Advisory Publication, Mar. 1, 1992.*
"Ground–Support Equipment", Anonymous, *Air Transport World*, vol. 31, No. 10, pp. 107–113, Oct. 1994.
"American reduces GSE Costs", *Airports International*, p. 29, Oct. 29, 1994.

* cited by examiner

*Primary Examiner*—Thomas G. Black
*Assistant Examiner*—Tuan C To
(74) *Attorney, Agent, or Firm*—Kinney & Lange P.A.

(57) ABSTRACT

A dynamic aircraft maintenance production system for planning a maintenance check of an aircraft includes means for obtaining any routine tasks that may exist and which are required to be performed on the aircraft, means for obtaining any non-routine tasks that may exist and which are required to be performed on the aircraft, means for generating a maintenance flow chart detailing scheduling data for each of the routine and non-routine tasks, means for assigning a user-determined number of the routine and non-routine tasks to personnel for completion, means for maintenance activity data on each assigned routine task and non-routine task, means for available resource data, and means for updating the maintenance flow chart to reflect newly-obtained maintenance activity data and available resource data.

28 Claims, 19 Drawing Sheets

(SYSTEM OVERVIEW)

(MRB PROGRAM MANAGER)

Aircraft: TEST  Session User: Sinex

| General ▷ | Administration ▷ | Maintenance ▷ | Line Maint ▷ | Program Mgt ▷ | Parts ▷ | Permissions ▷ |

A* Checks

| | DESCRIPTION | COUNT | M/H | FORM# | HOURS | CYCLES | MONTHS | | | |
|---|---|---|---|---|---|---|---|---|---|---|
| A1 | | 58 | 23 | AC2001 | 4000 | 4000 | | Revise | View | Checklist |
| A2 | | 66 | 23 | AC2002 | 4000 | 4000 | | Revise | View | Checklist |
| A3 | | 65 | 12 | AC2003 | 4000 | 4000 | | Revise | View | Checklist |
| A4 | | 71 | 12 | AC2004 | 4000 | 4000 | | Revise | View | Checklist |
| A5 | | 62 | 12 | AC2005 | 4000 | 4000 | | Revise | View | Checklist |
| A6 | | 58 | 12 | AC2006 | 4000 | 4000 | | Revise | View | Checklist |
| A7 | | 62 | 15 | AC2007 | 4000 | 4000 | | Revise | View | Checklist |
| A8 | | 75 | 15 | AC2008 | 4000 | 4000 | | Revise | View | Checklist |
| A9 | | 66 | 21 | AC2009 | 4000 | 4000 | | Revise | View | Checklist |
| A10 | | 79 | 21 | AC2010 | 4000 | 4000 | | Revise | View | Checklist |
| A11 | | 57 | 19 | AC2011 | 4000 | 4000 | | Revise | View | Checklist |
| A12 | | 86 | 19 | AC2012 | 4000 | 4000 | | Revise | View | Checklist |
| A13 | | 65 | 18 | AC2013 | 4000 | 4000 | | Revise | View | Checklist |
| A14 | | 69 | 18 | AC2014 | 4000 | 4000 | | Revise | View | Checklist |
| A15 | | 67 | 18 | AC2015 | 4000 | 4000 | | Revise | View | Checklist |
| A16 | | 69 | 18 | AC2016 | 4000 | 4000 | | Revise | View | Checklist |

| | | | | | | |
|---|---|---|---|---|---|---|
| 61-13 | Check SECONDARY LOW-PITCH STOP (BETA) operation. O | 400FH | 0.1 | OP | 221, 222, 411, 421 | revise |
| 61-13 | Check SECONDARY LOW-PITCH STOP (BETA) operation. O | 400FH | 0.1 | OP | 221, 222, 411, 421 | revise |
| 71-10 | Verify DRAIN COLLECTOR TANK RETURN LINE check valves operation. O | 1C | 0.1 | OP | 433 | revise |
| 71-12 | Check EEC Nh OVERSPEED PROTECTIVE FUNCTION OPERATION (MSI 73-20-02). O | 600FH | 0.45 | OP | 221 | revise |
| 760-07 | Check flight idle stop system. O | 1A | 0.08 | OP | 221, 222 | revise |
| 79-10 | Check engine model PW118/118A/118B chip detector. NOTE - According to manufacturer's recommendation approved by Canadian DOT. (See MRB Appendix 8.7 or MPG Appendix VI). O | SPECIAL | 0.17 | OP | 412 | revise |
| UPPER FUSELAGE ABOVE CABIN FLOOR | | | | | | |
| 24-08 | Test MAIN BATTERY load capacity. O | 5A | 0.9 | FC | 115 | revise |
| 24-09 | Check MAIN BATTERY electrolite level. 1 | 1A | 0.5 | IN | 115 | revise |
| 5310-131-02E | Toilet flush valve support. NOTE - Applicable to FWD lavatory installation only. 1 | 1A | 0.08 | ESU | 131, 132 | revise |
| 2710-143-01E | Perform external surveillance in wing center section. Lower skin panel and access panels from CL to wing rib 3. Requires fairing removal. 1 | 2A | 3 | ESU | 143 | revise |
| TAILCONE & EMPENNAGE GROUP | | | | | | |
| 322-01Z | ZONE 322 - DORSAL FIN - Perform external surveillance of the one, including visual examination of the vortex generators (Pre-Mod. SB 120-055-0008). 1 | 1A | 0.08 | ISU | 322 | revise |
| 323-01Z | ZONE 323 - VERTICAL STABILIZER LEADING EDGE - Perform external surveillance of the zone, including visual examination of the vortex generators (Pre-MOD. SB 120-055-0008). 3 | 1A | 0.08 | ESU | 323 | revise |
| 326-01Z | ZONE 326 - RUDDER I - Perform external surveillance of | 1A | 0.17 | ESU | 326 | revise |

(TRACKING MANAGER)

Aircraft: TEST | Session User: Sinex

| General ▷ | Administration ▷ | Maintenance ▷ | Line Maint ▷ | Program Mgt ▷ | Parts ▷ | Permissions ▷ |

STRUCTURES

| SOURCE | DESCRIPTION | DONE | DUE | |
|---|---|---|---|---|
| 5210-811-01E<br>Interval<br>800 FC | 5210-811-01 Passenger/crew entry door visible structure, stops and fittings.<br>Program Interval A2, A5, A11, A17, A8, A14, A20, | 8/23/99 dte<br>22871.1 hrs<br>23468 cyc | dte<br>hrs<br>24268 cyc | VIEW |
| 5210-811-011<br>Interval<br>24000FC | 5210-811-011 Passenger/crew entry door internal elements, including stops and fittings. Requires door lining removal.<br>Program Interval 24000FC, | 9/26/00 dte<br>23160.1 hrs<br>23794 cyc | dte<br>hrs<br>47794 cyc | VIEW |
| 5220-812-01E<br>Interval<br>24000FC | 5220-812-01E Escape hatches visible structure.<br>Program Interval 8000FC, | 10/25/99 dte<br>23152.1 hrs<br>23789 cyc | dte<br>hrs<br>31789 cyc | VIEW |
| 5220-812-01E<br>Interval<br>8000FC | 5220-812-01E Escape hatch internal elements, including window frame. Requires door lining removal.<br>Program Interval 32000FC, | dte<br>hrs<br>0 cyc | dte<br>hrs<br>32000 cyc | VIEW |
| 5220-812-01I<br>Interval<br>32000FC | 5220-812-02E Perform external surveillance in escape hatch window frame.<br>Program Interval A3, A8, A13, A18, | 10/2/99 dte<br>23145 hrs<br>23786 cyc | dte<br>hrs<br>24986 cyc | VIEW |
| 5220-812-02E<br>Interval<br>1200FC | 5230-813-01E Cargo door visible structure.<br>Program Interval 4000FC | 10/25/99 dte<br>23152.1 hrs<br>23789 cyc | dte<br>hrs<br>27789 cyc | VIEW |

FIG. 6

Aircraft: N205CA | Session User: Sinex

[General ▽] [Administration ▽] [Maintenance ▽] [Line Maint ▽] [Program Mgt ▽] [Parts ▽] [Permissions ▽]

Tasks Due by 11/30/2000 or within 1000 hours or within 10 cycles

Select tasks due within

1000 Hours or 10 Cycles or by 11/30/2000 Date — 146

[Retrieve Records] — 148

Select a Workorder

[Edit Workorders] — 156

| Description | Meter | Last Completed 152 | | | Limits 154 | | | Remaining 156 | | |
|---|---|---|---|---|---|---|---|---|---|---|
| | | Hrs | Cyc | Date | Hrs | Cyc | Mo's | Hrs | Cyc | Days |
| 24-10 Restore APU STARTER-GENERATOR. NOTE - According to manufacturer's recommendation. (See MRB Appendix 8.7 or MPG Appendix VI). | APU | 12457.0 | | | 1200 | | | 9 | | |
| 49-06 Discard GARRET APU model GTCP36-150(A)(AA) OIL FILTER ELEMENT. NOTE - According to mfr. recommendation. (See MRB appendix 88.7 or MPG Appendix VI) | APU | 13050.0 | | | 750 | | | 152 | | |
| 49-03 Check APU CHIP DETECTOR. NOTE - According to manufacturer's recommendation. (See MRB Appendix 8.7 or MPG Appendix VI). | APU | 13050.8 | | 1/22/00 | 750 | | 12 | 153 | | 53 |
| 24-13 Verify APU starter-generator GCU (GENERATOR CONTROL UNIT) operation | APU | 12357.0 | | | 1600 | | | 309 | | |
| 24-11 Visually check APU starter-generator QUICK ATTACH/DETACH QAD KIT generator condition. NOTE - At the time of starter-generator restoration. | APU | 13050.6 | | | 1200 | | | 603 | | |
| 4 Day - Service Check | A/C | | | 11/24/00 | | | | | | 2 |
| 520-07 Verify operation of escape hatch locking mechanism. NOTE - Requires removal of escape hatches - 400FH or 2MO | A/C | 19965.5 | 20415 | 10/2/00 | 400 | | 2 | 367 | 2 | |

FIG. 7

(DAMP MANAGER)

FIG. 10

CREW ASSIGNMENT

US248 | General ▽ | Crew Assign ▽ | LOG OFF | Roche

Get All Tasks

J2-11-57502-023 #2 SEVERAL WORN AREAS UNDERSIDE/AFT TEFLON AREA....MARKED

| | MultiTask | Richter | Von Kaenel | Albin | Murphy | Ranck | Andrews, Jr. | Wilson | Marler | Roche | Wagner | Mietla | Kirpalani | Inspector | |
|---|---|---|---|---|---|---|---|---|---|---|---|---|---|---|---|
| Mech 1 | ☐ | ☐ | ☐ | ☒ | ☐ | ☐ | ☐ | ☐ | ☐ | ☐ | ☐ | ☐ | ☐ | ☐ | Workcard |
| Hrs 0 | | | | | | | | | | | | | | | |

J2-15-27500 INSP LT FLAP TRK FAIRING

| | MultiTask | Richter | Von Kaenel | Albin | Murphy | Ranck | Andrews, Jr. | Wilson | Marler | Roche | Wagner | Mietla | Kirpalani | Inspector | |
|---|---|---|---|---|---|---|---|---|---|---|---|---|---|---|---|
| Mech 1 | ☐ | ☐ | ☐ | ☒ | ☐ | ☐ | ☐ | ☐ | ☐ | ☐ | ☐ | ☐ | ☐ | ☐ | Workcard |
| Hrs | | | | | | | | | | | | | | | |

J2-15-93864 WINGS-INSTL RLF-VLV/ARRESTR

| | MultiTask | Richter | Von Kaenel | Albin | Murphy | Ranck | Andrews, Jr. | Wilson | Marler | Roche | Wagner | Mietla | Kirpalani | Inspector | |
|---|---|---|---|---|---|---|---|---|---|---|---|---|---|---|---|
| Mech 1 | ☐ | ☐ | ☐ | ☐ | ☐ | ☐ | ☐ | ☐ | ☐ | ☐ | ☐ | ☐ | ☐ | ☐ | Workcard |
| Hrs | | | | | | | | | | | | | | | |

J2-42-52500-C INSP NOSE COMP AC DR (AD)

| | MultiTask | Richter | Von Kaenel | Albin | Murphy | Ranck | Andrews, Jr. | Wilson | Marler | Roche | Wagner | Mietla | Kirpalani | Inspector | |
|---|---|---|---|---|---|---|---|---|---|---|---|---|---|---|---|
| Mech 1 | ☐ | ☐ | ☐ | ☐ | ☐ | ☐ | ☐ | ☐ | ☐ | ☐ | ☐ | ☐ | ☐ | ☐ | Workcard |
| Hrs | | | | | | | | | | | | | | | |

FIG. 11A

| US248 General ▽ | Crew ▽ | | LOG OFF | Albin | |
|---|---|---|---|---|---|
| *Get All Tasks* | | | | | |
| | CURRENT ASSIGNMENT | | | | |
| J2-11-57502-023 #2 SEVERAL WORN AREAS UNDERSIDE/AFT TEFLON AREA....MARKED<br>M.Albin, Inspector | | | | | Work Card |
| J2-15-27500 INSP LT FLAP TRK FAIRING<br>M. Albin, Inspector | | | | | Work Card |
| J2-15-93864 WINGS-INSTL RLF-VLV/ARRESTR<br>M. Albin, Inspector, Callison | | | | | Work Card |

| US248 General ▽ | Crew Assign ▽ | LOG OFF | Roche |

DAY 11 OF 28

Task Re-Evaluations

| DESCRIPTION | EST | ACT | Time Remaining |
|---|---|---|---|
| J2-11-57502-023 #2 SEVERAL WORN AREAS UNDERSIDE AFT TEFLON AREA....MARKED | 1 | 2 | 115, 215, 310 |

| LOG OFF | Richter ☒ | Von Kaenel ☒ | Albin ☒ | Murphy ☒ | Ranck ☒ | Andrews, Jr. ☒ | Wilson ☒ | Marler ☒ | Roche ☒ | Wagner ☒ | Mietla ☒ | Kirpalani ☒ | Sign Out |

(AUTO ASSIGN)

DYNAMIC AIRCRAFT MAINTENANCE PRODUCTION SYSTEM

CROSS-REFERENCE TO RELATED APPLICATIONS

This application claims priority from Provisional Application No. 60/168,400, filed Dec. 1, 1999 for "Computerized Aircraft Maintenance Tracking Programming System" by Barry Sinex. Reference is hereby made to the following copending applications, which were filed on even date with the present application: "Dynamic Aircraft Maintenance Management System", by Barry Sinex, application Ser. No. 09/728,773, filed Dec. 1, 2000 which is now U.S. Pat. No. 6,447,459; "Aircraft Maintenance Program Manager", by Barry Sinex, application Ser. No. 09/728,579, filed Dec. 1, 2000 which is now U.S. Pat. No. 6,606,546; "Aircraft Tracking System", by Barry Sinex, application Ser. No. 09/728,774, filed Dec. 1, 2000, which is now U.S. Pat. No. 6,418,361; "Dynamic Assignment of Maintenance Tasks to Aircraft Maintenance Personnel", application Ser. No. 09/727,671, filed Dec. 1, 2000 by Barry Sinex and "Dynamic Management of Aircraft Part Reliability Data", by Barry Sinex, application Ser. No. 09/728,565, filed Dec. 1, 2000.

BACKGROUND OF THE INVENTION

The present invention relates to the field of aircraft maintenance. More specifically, the present invention relates to a system and method for dynamically planning a maintenance check of an aircraft.

Aircraft maintenance occupies a key position in airline operation because such maintenance is essential to the safety of passengers and the reliability of airline schedules. Each aircraft has its own maintenance requirements which are designed to keep the aircraft in an airworthy condition. These aircraft maintenance requirements typically originate from the aircraft's manufacturer, and can be revised throughout the life of the aircraft by the aircraft manufactures, the Federal Aviation Administration (FAA) and/or the Maintenance Review Board (MRB).

These aircraft maintenance requirements are documented in aircraft-specific MRB documents. An MRB document details each task that must be accomplished on a particular aircraft, the requirements of that task, and the frequency with which the task must be performed. The MRB document includes tasks that need to be accomplished anywhere from once a day to once every 20 years, as well as tasks that need to be accomplished after the aircraft has achieved a specific number of flight hours, flight cycles or other triggering indicia. For most major aircraft types, the MRB document lists somewhere between 800 to 2,000 different tasks.

The MRB document details a very complicated maintenance schedule. To ensure compliance with the MRB document, airlines must implement various tracking programs to monitor for the dates when tasks come due, as well as to log the completion of those tasks and any corrective actions taken.

Because an aircraft produces revenue only when it is flying, it is essential for airline management to keep maintenance time at a minimum. Thus, airlines commonly group tasks together (into letter-checks) rather than perform the tasks one at a time as they come due. Letter checks commonly include "A checks", "B checks", "C checks" and "D checks", with A checks occurring most frequently and having the fewest number of tasks. A and B checks typically can be performed overnight in a "line maintenance" environment, in which, assuming no complications arise, the aircraft typically loses little or no flight time. In this environment, the aircraft remains airworthy because it can be reassembled quickly.

Conversely, C and D checks comprise a greater number of tasks, many of which require a substantial amount of time to complete. Thus C and D checks are typically performed in a heavy maintenance environment in which the aircraft is taken out of service. In this environment, an aircraft is taken into a hanger, where it is taken apart, inspected, fixed and reassembled during the course of one week to over a month. During this heavy maintenance period, non-routine tasks (those not detailed in the MRB document) are identified (often as a result of an inspection mandated by the MRB document), and parts that have reached their hard limits specified by the MRB document are replaced. Upwards of 300 persons (including cleaners, mechanics, lead mechanics, inspectors and lead inspectors) may work on the maintenance of the aircraft. In addition, a management team including managers, supervisors, directors, production coordinators and shops managers coordinate the completion of the maintenance. This maintenance team typically works in three shifts a day, seven days a week, to complete the needed maintenance.

To minimize the number of days the aircraft is removed from operation, a maintenance plan must be developed to assign and monitor the completion of tasks. The development of such a plan is made more difficult by the identification of non-routine tasks during the maintenance, back orders on parts which preclude the completion of certain tasks and the failure to complete timely critical path tasks (those which prevent subsequent tasks from being completed). No computer-based method exists to dynamically prepare such a maintenance plan using dynamically changing information, such as available labor hours, sequence and dependency of tasks, and the addition of non-routine tasks.

Airlines can further save costs by escalating, when permissible, the intervals at which tasks are performed. Based upon reliability data collected by an airline during maintenance of their own aircrafts, the FAA may allow the airline to more favorably escalate tasks beyond the requirements of the MRB document (i.e, require the task to be performed at longer intervals). Thus, if a task to inspect a particular part is performed as required every six months, and the part is consistently (throughout the fleet) in good condition, the task may be escalated to one a year (or some other interval). Such escalations of tasks can significantly affect the time and cost of maintaining an airline's fleet of aircraft. A reliability program thus modifies, for a particular airline only, an aircraft's MRB document by changing the intervals required between overhauls, inspections and checks of aircraft equipment. Guidance on reliability program elements is listed in Advisory Circular (AC) 120-17, Maintenance Program Management Through Reliability Methods, as amended, the Airline/Manufacturer Maintenance Program Planning Document, MSG-2/3, and/or Maintenance Tasks.

A reliability program can further help airlines determine whether individual warrantied parts have met the manufacturer's predicted life limits. Often, manufacturers of aircraft parts, especially engine parts, guarantee that the part will not fail before a specified number of hours. Thus, a reliability program can enable airlines to get warranty money back from warranty administration on that part if the part does not meet the manufacturer's predicted life limits. There is no computer-based program for monitoring the reliability program of an entire fleet of aircraft as it relates to the requirements of the MRB document, which uses data dynamically collected during the process of maintenance.

Another aspect of an aircraft maintenance program for an airline is the proper training of its personnel. The FAA has very strict standards regarding the training required of aircraft mechanics. Before permitting a mechanic to perform a task, the FAA requires that the mechanic have been previously supervised doing the task or specifically trained for the task. The FAA additionally requires much of the training to be performed on a recurrent basis. Therefore, airlines must monitor and log all training received by its maintenance employees.

Airlines must also maintain a significant number of publications, such as the MRB document, training manuals, maintenance manuals, illustrated parts catalogs, structural repair manuals, aircraft wiring diagrams and a general engineering and maintenance manual. Presently, these documents are mostly maintained in paper format.

No system presently exists to integrate all of the above-listed facets of a successful aircraft maintenance program. Additionally, no system presently exists to dynamically manage an aircraft's MRB document, to dynamically monitor for the dates when tasks are due on an aircraft, to log the completion of tasks and corrective actions taken on an aircraft, to dynamically prepare a maintenance plan, to dynamically collect reliability data or to dynamically collect personnel training records. Accordingly, there is a need for a system and method for dynamically managing, in real-time, aircraft maintenance requirements.

BRIEF SUMMARY OF THE INVENTION

The present invention is a dynamic aircraft maintenance production system for planning a maintenance check of an aircraft. The dynamic aircraft maintenance production system includes means for obtaining any routine tasks that may exist and which are required to be performed on the aircraft, means for obtaining any non-routine tasks that may exist and which are required to be performed on the aircraft, means for generating a maintenance flow chart detailing scheduling data for each of the routine and non-routine tasks, means for assigning a user-determined number of the routine and non-routine tasks to personnel for completion, means for maintenance activity data on each assigned routine task and non-routine task, means for available resource data, and means for updating the maintenance flow chart to reflect newly-obtained maintenance activity data and available resource data.

BRIEF DESCRIPTION OF THE DRAWINGS

FIGS. 3–4 illustrate example graphical user interfaces (GUI) used in conjunction with the MRB program manager component of the system of FIG. 1.

FIGS. 6–7 illustrate example graphical user interfaces (GUIs) used in conjunction with the tracking manager component of the system of FIG. 1.

FIGS. 9–17 illustrate example graphical user interfaces (GUIs) used in conjunction with the DAMP manager component of the system of FIG. 1.

DETAILED DESCRIPTION

Figure 1:
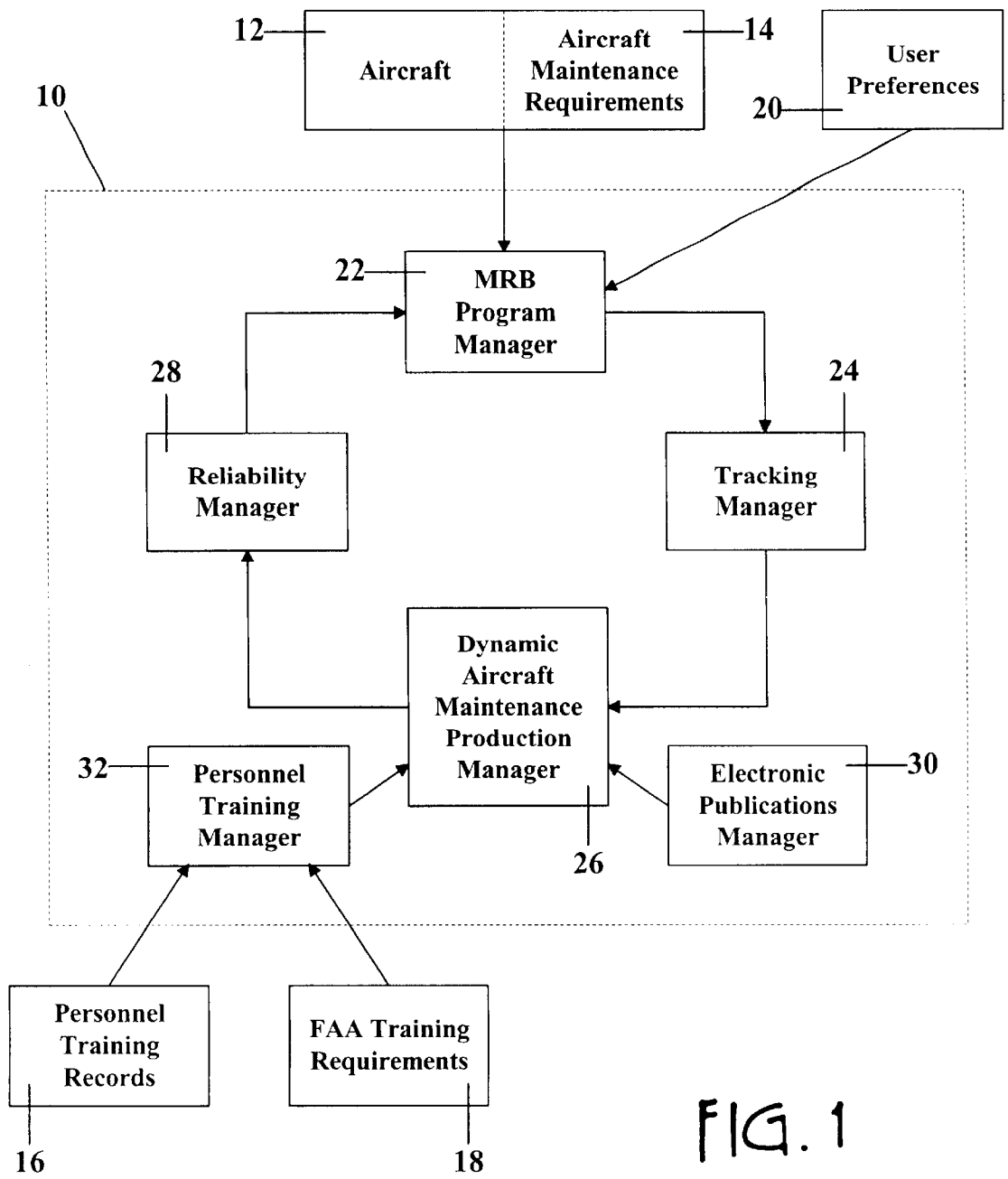
FIG. 1 is a simplified block diagram of a system in accord with the present invention for dynamically managing, in real-time, aircraft maintenance requirements.

FIG. 1 is a simplified block diagram of system 10 in accord with the present invention for dynamically managing, in real-time, aircraft maintenance requirements. System 10 interfaces with a plurality of aircraft, such as aircraft 12, corresponding aircraft maintenance requirements, such as aircraft maintenance requirements 14, personnel training records 16, FAA training requirements 18, and user preferences 20. System 10 is a multiple component system which includes Maintenance Review Board (MRB) program manager 22, aircraft tracking manager 24, Dynamic Aircraft Maintenance Production (DAMP) manager 26, reliability manager 28, electronic publications manager 30 and personnel training manager 32.

From aircraft maintenance requirements 14, MRB program manager 22 extracts maintenance tasks required for aircraft 12 and, for each task, time control points (or limits by which the task must be performed). MRB program manager uses this information to allow an airline operator to organize these tasks into logical groups which can be simultaneously performed. MRB program manager 22 provides the maintenance plan, along with the corresponding time control points, to aircraft tracking manager 24.

Tracking manager 24 monitors accumulated time data, such as flight hours and cycles), and compares this data to the data received from MRB program manager, to report on which tasks are approaching their time control point. Tracking manager 24 may also be used by an airline operator to schedule tasks during maintenance visits managed by DAMP manager 26.

When aircraft 12 enters a heavy maintenance period, DAMP manager 26 allows airline operators to create a dynamic maintenance program for assigning and monitoring the completion of tasks on aircraft 12.

Upon completion of a heavy maintenance period, reliability manager 28 records data relating to reliability of individual aircraft parts. The airline's reliability board may later use reliability manager 28 to query the reliability data and generate reports useful for recommending changes to the MRB program.

Electronic publications manager 30 is a tool which gathers the multitude of publications needed in the aircraft maintenance industry, and provides them in an on-line environment.

Personnel training manager 32 provides tools for an airline operator to assign instructors, students, classrooms and audio visual equipment to specific training courses. Personnel training manager 32 further provides access from DAMP manager 26 to personnel training records 16 to enable an airline to know exactly when and what training its employees need.

Although it is preferable that an airline maintenance program utilize each of the components included in system 10 of FIG. 1, those skilled in the art will recognize that each of the individual components may be used independently, collectively, or in combinations of the components. Thus, an airline may incorporate only MRB program manager 22 and DAMP manager 26 with its own existing legacy system for monitoring when tasks are due on an aircraft.

System Inputs

Aircraft maintenance requirements 14, which originate from the aircraft manufacturer, list the tasks that must be accomplished on aircraft 12 and the timescale for how often the tasks must be accomplished in order to keep aircraft 12 in airworthy condition. The Maintenance Review Board (MRB) collects this information. These requirements can be revised throughout the life of aircraft 12 by any of the aircraft manufacturer, the Federal Aviation Administration (FAA), the Maintenance Review Board (MRB) or the airline operator (with FAA approval). Aircraft maintenance requirements 14 may include information regarding routine tasks, customer-specific tasks, FAA Airworthiness Directives, Manufacturer's Service Bulletins and Letters, and other trackable tasks required for airline maintenance.

Personnel training records 16 include data regarding the types of training each maintenance employee has received, and when that training was administered. FAA training requirements 18 document the training required of a maintenance employee before that employee can perform specified maintenance tasks.

MRB Program Manager

MRB program manager 22 takes aircraft maintenance requirements 14 and creates a maintenance program for aircraft 12. MRB program manager 22 allows an airline operator to organize all of the maintenance tasks into logical groups based on frequency, type, and an airline's operational/scheduling preferences 20. As a result, MRB program manager 22 provides a customized maintenance schedule that allows the airline to not only keep track of each maintenance task individually, but also carry out the maintenance tasks much more efficiently.

Figure 2:
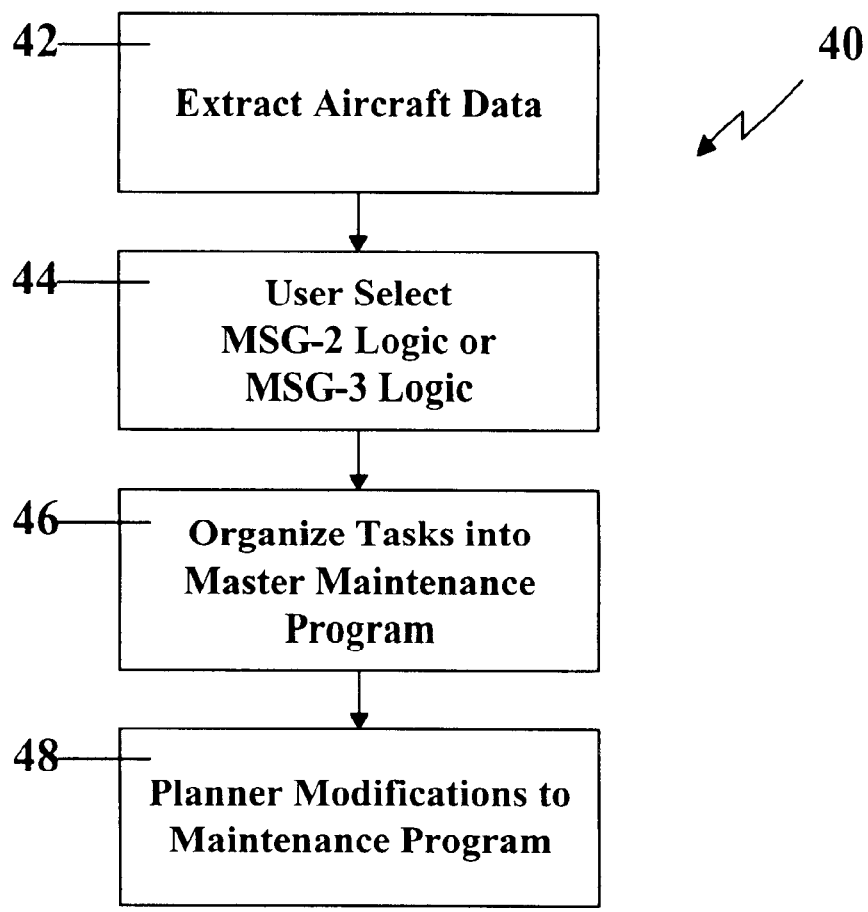
FIG. 2 is a flow diagram of an MRB program manager component of the system of FIG. 1.

FIG. 2 is a flow diagram 40 of MRB program manager 22 of system 10 of FIG. 1. During its initial setup, which is step 42, MRB program manager 22 extracts from aircraft maintenance requirements 14, all of the tasks that must be performed on an aircraft of type aircraft 12, as well as the time control points (or limits by which the task must be performed) for each task.

At step 44, an airline operator will select whether logic formula MSG-2 (Maintenance Steering Group) or logic formula MSG-3 MRB will be used to organize tasks. With logic formula MSG-2, parts are changed at standard times regardless of whether the part actually needs to be changed. Thus, under MSG-2 logic, a part is always replaced at or before its normal life expectancy. Conversely, under logic formula MSG-3, parts are not replaced until broken. MSG-3 logic allows the MRB document to be revised based upon reliability data for the part during its life cycle. Thus, the types of tasks assigned under MSG-2 logic varies from the types of tasks assigned in MSG-3 logic; that is, more inspection tasks will be performed under MSG-3 logic than under MSG-2 logic, while more part replacement tasks will be performed under MSG-2 logic than under MSG-3 logic.

At step 46, the extracted tasks are organized into letter checks, flight cycle checks (those tasks scheduled by flight cycles), separately tracked tasks and special tasks.

Depending on individual requirements, at step 48, airline management may modify, at anytime, the initial grouping of tasks, as long as none of the time control points, or limits by which a task must be performed, is exceeded by the modified plan.

MRB program manager 22 preferably provides both the master maintenance program and the airline-modified maintenance program, along with the corresponding time control points, to aircraft tracking manager 24.

FIG. 3 illustrates example graphical user interface (GUI) 50 used in conjunction with MRB program manager 22 of system 10. In the example of FIG. 3, the tasks of a test aircraft are organized into a plurality of checks including A checks 52. Other types of checks not illustrated in FIG. 3 are C checks, eight-year checks, flight cycle checks, and special checks. In GUI 50, column 54 lists the name of each check. Column 56 details the number of tasks included within each of the plurality of checks. Column 58 details the forecasted hours required to complete each task. Column 60 lists the form number of each task. Columns 62 list the time control points (or interval periods at which each of the plurality of checks is to be performed). The time control point may be listed as a specific number of flight hours, flight cycles or months. For each of the plurality of checks, buttons are provided to allow an airline operator to revise the checks ("Revise" button in column 64), view the tasks within the check ("View" button in column 66), or generate a checklist of the tasks within the check ("Checklist" button in column 68).

FIG. 4 illustrates example graphical user interface (GUI) 80 used in conjunction with MRB program manager 22 of system 10. GUI 80 illustrates a partial listing of tasks 82 to be performed in conjunction with a selected one of A checks 52 of FIG. 3. Tasks 82 within selected A check 52 are organized by region of the aircraft, such as "upper fuselage above cabin floor" and "tailcone & empennage group". For each task 82 listed in GUI 80, column 84 provides a task number, column 86 provides a task description, column 88 provides the task's official MRB interval (or time control point), column 90 provides an approximation of the amount of time required to perform the task, column 92 provides the task type, and column 94 provides the zone in which the work is to be performed. Details of each task 82 can be revised by selecting the corresponding "Revise" button provided in column 96.

In a preferred embodiment, MRB program manager 22 will include data converters to convert information stored in an airline's legacy system into a format usable by MRB program manager 22.

Aircraft Tracking Manager

Aircraft tracking manager 24 functions as an aircraft scheduling tool by keeping track of all maintenance activities accomplished on aircraft 12. Tracking manager 24 receives a maintenance program as an input from MRB program manager 22, tracks the amount of accumulated time for each maintenance task, and outputs tracking information in the form of a status report. If tracking manager 24 is used independently, the maintenance program is input from aircraft maintenance requirements 14.

Figure 5:
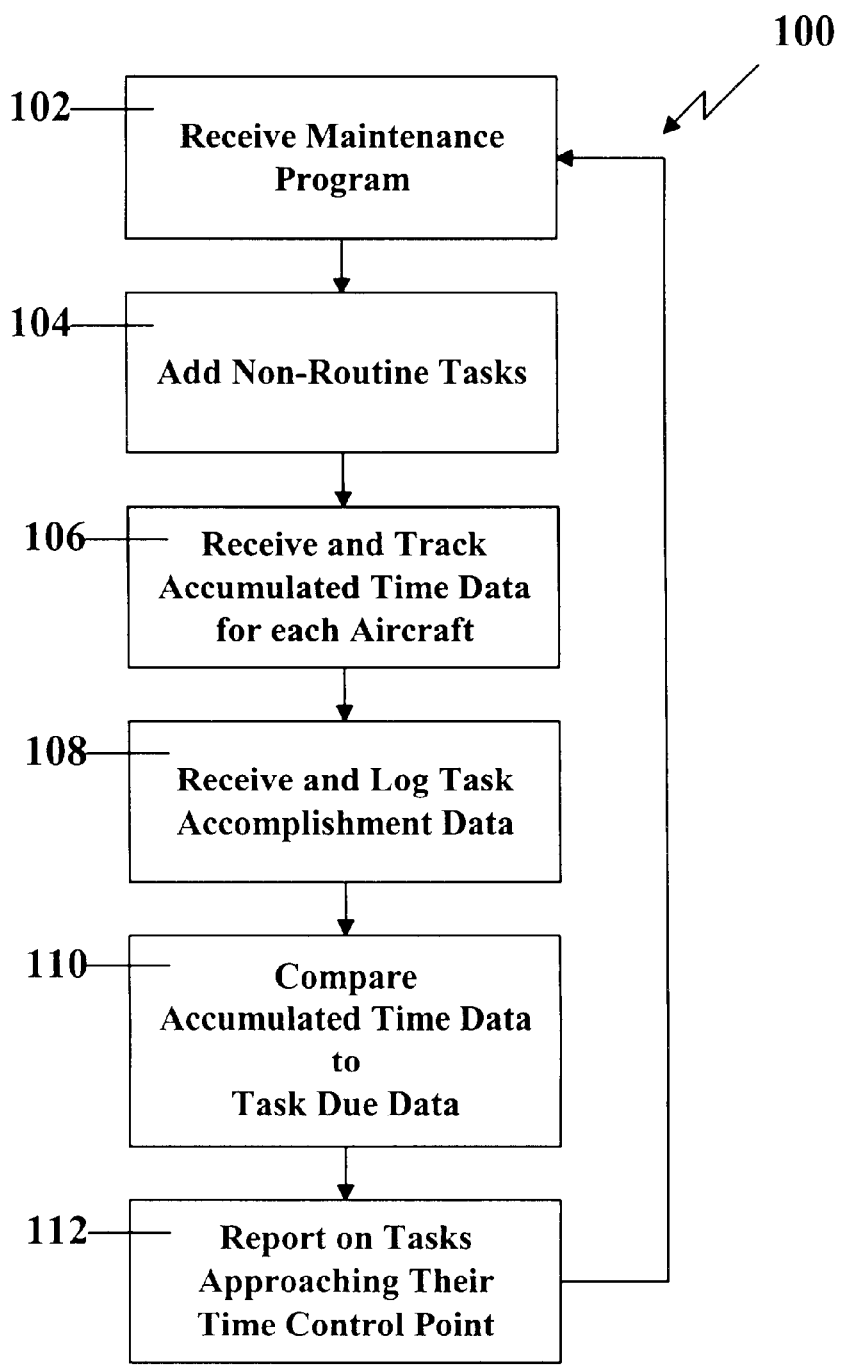
FIG. 5 is a flow diagram of a tracking manager component of the system of FIG. 1.

FIG. 5 is a flow diagram 100 of tracking manager 24 of system 10. At step 102, tracking manager 24 receives the maintenance program. Preferably, MRB program manager 22 provides the master maintenance program, the airline-modified maintenance program, and corresponding time control points to aircraft tracking manager 24.

At step 104, non-routine tasks are added to the maintenance program, thereby allow both routine and non-routine tasks to be tracked. When a non-routine task is generated, it is linked to a particular routine task (the performance of which resulted in the non-routine task). Reliability manager 28 may then use that relationship to determine whether a maintenance interval for a part can be escalated, or if it needs to be de-escalated.

At step 106, tracking manager 24 keeps track of information such as how many flight cycles, flight hours and time aircraft 12 has accumulated. When integrated with MRB program manager 22, tracking manager 24 ensures that aircraft 12 is not flown through one of its maintenance limits. Tracking data may be automatically entered into tracking manager 24 by an automated system installed aboard aircraft 12 or manually by airline ground crews. Manually-entered data may be entered at the end of a day by maintenance crews performing the aircraft's daily line check. Tracking data may also be provided by dispatch employees who also monitor this information.

At step 108, tracking manager 24 receives and logs all maintenance activities accomplished on aircraft 12, thereby serving as a maintenance logbook for aircraft 12. In this capacity, tracking manager 24 stores such information about each discrete task accomplished on aircraft 12 as what was done, what was replaced, who did the work and when was the work done. To meet FAA requirements, the electronic logbook may be printed and stored in paper format. When, if ever, the FAA approves the electronic storage of aircraft maintenance logbooks, airlines will no longer need to store paper copies of its maintenance records.

At step 110, tracking manager 24 compares, for each task, the accumulated time data to the task due data to determine which tasks will soon require maintenance, and at step 112, tracking manager 24 reports these results. By tracking each task as both an individual task and as a part of a task group (or check), the airline may move tasks into different groups without the danger of exceeding the task limitations.

Various status reports can be generated by users of tracking manager 24 by making inquires as to what tasks need to be completed within selected parameters. FIG. 6 illustrates example graphical user interface (GUI) 120 used in conjunction with tracking manager 24. The example of FIG. 6 is a partial status report for test aircraft 12. The status report lists a plurality of tasks 122, and includes information on each task, such as, the MRB document source numbers listed in column 124 and a task description listed in column 126. Column 128 details the flight hour, flight cycle and date at which task 122 was last completed. Column 130 lists the flight hour, flight cycle or date by which task 122 must be performed. Finally, column 132 provides a "Revise" button allowing an airline operator to revise the specifications of a particular task.

FIG. 7 illustrates example graphical user interface (GUI) 140 used in conjunction with tracking manager 24. GUI 140 is an example "Tasks Due" screen 140 of system 10. Screen 140 shows, in real-time, a list of tasks due within a user-specified range of dates, hours, or cycles. The user can enter a number of hours 142, a number of cycles 144, or a date 146, and click on button 148 ("Retrieve Records") to retrieve a list of tasks due within the entered range. The resulting screen lists the task descriptions 150, the date last completed 152 (as well as the flight hours and flight cycles accrued by that completion date), the time limits 154 (or time control point), and the time remaining 156 for each task. The time remaining column will preferably provide a graphical cue to the user as to which tasks are overdue, which are nearing their due date, and which are not yet due. Such a graphical cue could be color-coding the remaining time information. In the example of FIG. 7, cells could be colored red to signify overdue tasks (not shown), cells 158 could be colored yellow to signify task which will be due within the user-specified range, and cells 159 could be colored white to signify tasks which are not yet due and outside the user-specified range. As the tasks are completed, the historical record for each task is updated in real-time to the current status. Screen 140 assists the user in developing the best plan and work order for an aircraft to insure that tasks are completed in a timely manner.

Tracking manager 24 may also be used by an airline operator to schedule tasks during maintenance visits managed by DAMP manager 26.

Dynamic Aircraft Maintenance Production (DAMP) Manager

DAMP manager 26 creates a dynamic maintenance program for assigning and monitoring the completion of tasks on aircraft 12 in a heavy maintenance environment. DAMP manager 26 is designed for multiple users of a production coordination system. Briefly, DAMP manager 26 is a system which allows maintenance employees to quickly, and easily, know what routine and non-routine tasks they are scheduled to complete; provides mechanic crew leads the ability to dynamically assign tasks to mechanics and to query which tasks are currently assigned and to whom they are assigned; and provides maintenance employees and supervisors the ability to compare actual time expended to complete a maintenance check to forecasted time for the maintenance check.

In the heavy maintenance environment, each individual maintenance team member, from mechanic to top-tier management, has a specific job to complete. An ideal maintenance plan for an aircraft would take into account the knowledge and experience of all employees working to maintain the aircraft. DAMP manager 26, in a sense, allows each employee to contribute to the overall maintenance production plan. In the DAMP system, each employee is given the tools they need to do their job. Each employee has access to computer screens containing information relevant to the completion of their own job. In using the system, each employee enters information into the system in response to the computer screens presented to the employee. That information is processed by DAMP manager 26, with the end result being that the mechanics always know exactly what tasks on which to work. Additionally, DAMP manager 26 creates a history of events to enable production coordinators to identify what works and what does not work in the maintenance plan.

Figure 8:
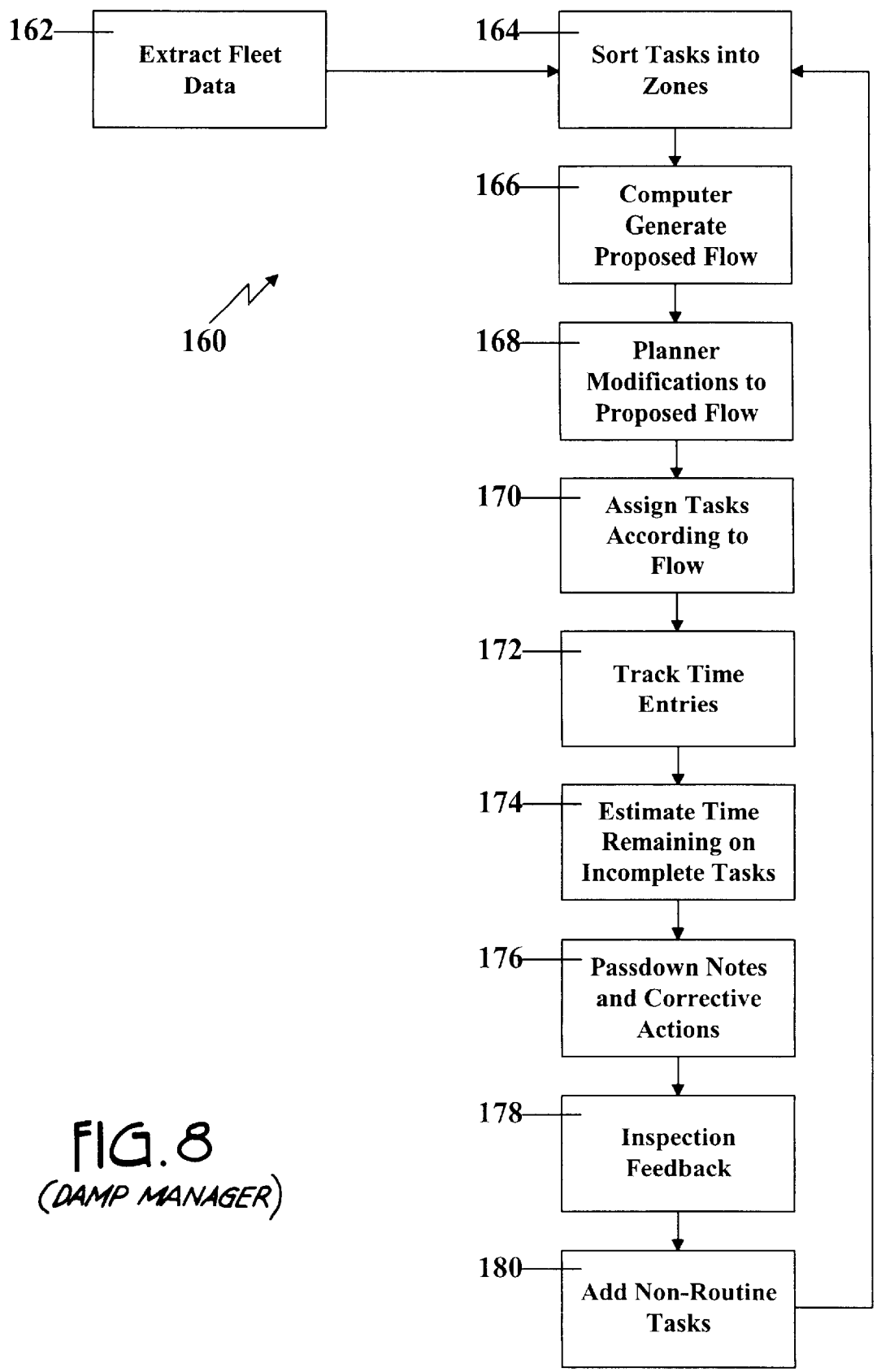
FIG. 8 is a flow diagram illustrating a preferred method of using a DAMP manager component of the system of FIG. 1 to complete a maintenance check of an aircraft.

FIG. 8 is a flow diagram 160 illustrating a preferred method of using DAMP manager 26 to complete a heavy maintenance check of aircraft 10. Initially, at step 162, DAMP manager 26 extracts data from MRB program manager 22 and tracking manager 24 to identify the routine tasks that need to be performed on aircraft 10. If DAMP manager 26 were operated in a stand-alone environment, this data would be retrieved directly from aircraft maintenance requirements 14, which would be abstracted by the airline operator.

At step 164, DAMP manager 26 preferably sorts the tasks into aircraft zones in which those tasks pertain, such as nose, tail or west wing.

At step 166, DAMP manager 26 generates a proposed flow for the aircraft. This flow may further be broken down by zone. In creating a proposed flow, DAMP manager 26 considers whether the completion of certain tasks is essential for the completion others.

At step 168, the production planner (the personnel member in charge of monitoring production flow) can modify the flow proposed by DAMP manager 26 based upon the availability of parts and employees, as well as the existence of non-routine tasks. Typically, the production planner knows the status of the shop and its available parts. For instance, if the planner knows that tires will not be available during the first week of maintenance, the planner can modify the flow to ensure that tasks relating to tire replacement do not occur during the first week. The planner may also add any known non-routine tasks to the flow.

Tasks are assigned to mechanics at step 170 in either a semiautomatic or automatic mode. If the semiautomatic mode is selected, tasks will be automatically be pulled from the flow diagram for a crew lead to assign to his crew. In this mode, the crew lead starts each shift by entering into DAMP manager 26 which employees are available. In response, DAMP manager 26 will generate a flow diagram for a user-selected number of shifts which includes tasks with forecasted completion times roughly matching the available manpower. The crew lead can then distribute those generated tasks to the mechanics in his crew. In the automatic mode, tasks are automatically assigned at the start of each shift by DAMP manager 26. This automatic mode is discussed later in this specification.

At step 172, mechanics sign into DAMP manager 26 to retrieve their task cards. When the mechanic signs in and accepts a first task, the clock starts running on the first task, and when the employee signs onto a second task, the clock stops running on the first task. DAMP manager 26 uses this information to monitor the amount of time spent completing each task. Later, the actual times can be compared to the forecasted times to determine if the maintenance program is on schedule. This information can also be accumulated over a number of checks, and used by crew leads to determine which employees are most efficient at each task.

When signing out of the DAMP manager 26 at the end of a shift, at step 174, the mechanics and/or crew lead estimate the amount of time remaining on any incomplete tasks.

Also when signing out of DAMP manager 26, at step 176, mechanics enter any passdown notes or corrective actions taken during the performance of a task. Often, tasks left incomplete at the end of a shift are picked up by a mechanic on the next shift. Passdown notes enable those mechanics who continue working on the task to know what was completed by the previous mechanic. These notes do not remain part of the maintenance records, and are discarded once the task has been completed. Corrective action notes indicate what corrective actions were taken by a mechanic, and become part of the official maintenance logbook for the aircraft.

At step 178, inspectors review the work performed by mechanics. If the work is acceptable, the task card is signed off by the inspector. If the work is unacceptable, the task remains in the production schedule to be reassigned. DAMP manager 26 also monitors the work of the inspectors. Thus, as with the tasks performed by mechanics, DAMP manager 26 monitors the amount of time the inspectors take to complete each inspection.

Often, while performing a routine task, the mechanics and inspectors will identify additional tasks that need to be accomplished to maintain the aircraft in an airworthy condition. At step 180, these non-routine tasks are entered into DAMP manager 26.

DAMP manager 26 constantly updates the overall completion time and tracks critical path jobs which will prevent subsequent jobs from being done. Thus, steps 164–180 are repeated until the maintenance check on the aircraft is complete.

Figure 9:
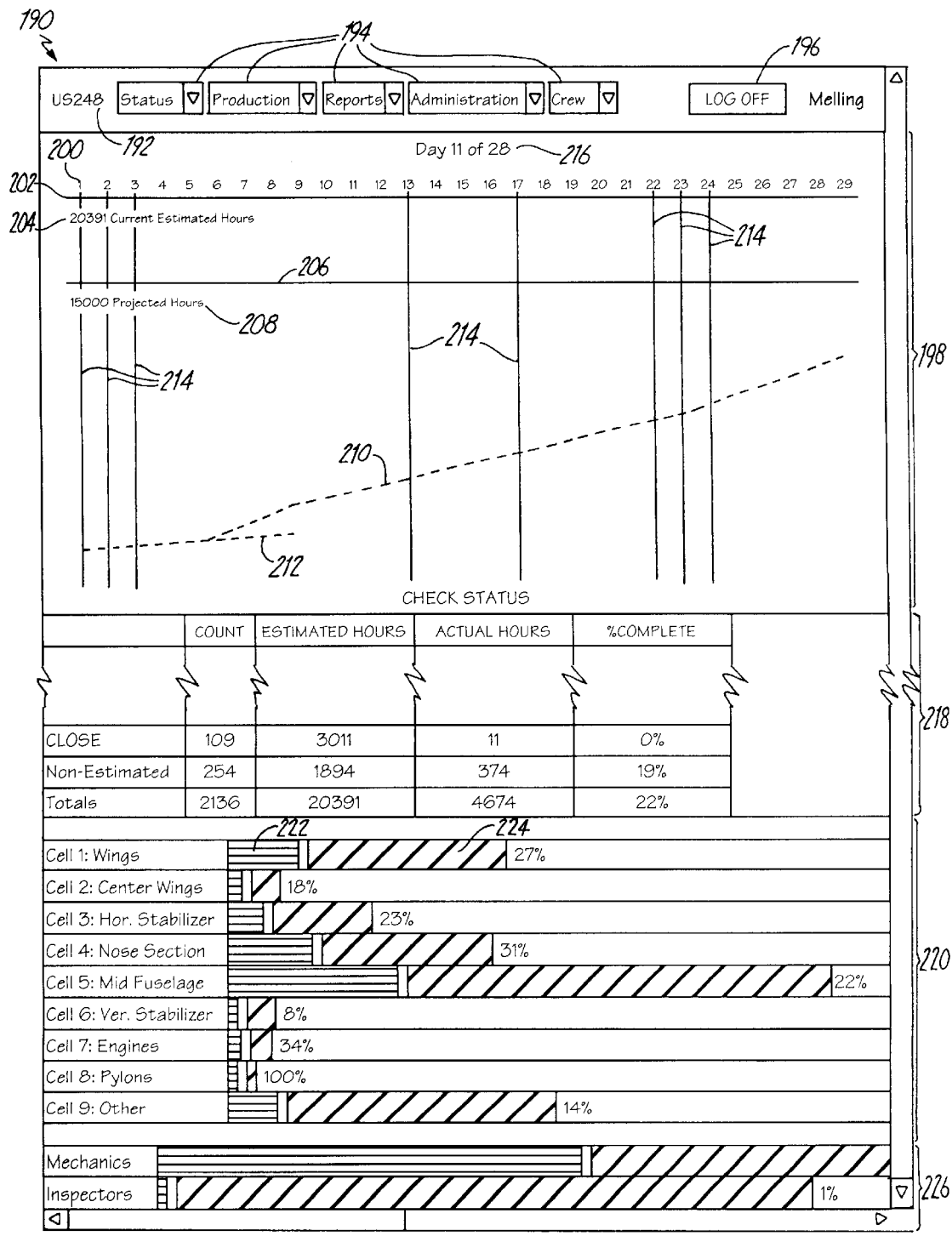

An example implementation of DAMP manager 26 is illustrated in FIGS. 9–17. FIG. 9 illustrates example graphical user interface (GUI) 190 used in conjunction with DAMP manager 26. GUI 190 is an example status screen of system 10. Screen 190 shows in real-time the current maintenance status of aircraft 12. Section 192 of GUI 190 displays the tail number of aircraft 12 (US248 in this example) and user name (Melling). Section 192 also includes pull-down menus 194. Each pull-down menu 194 provides additional levels of access in DAMP manager 26. Thus, a crew member would be provided with only one pull-down menu, while senior management would be provided with several pull-down menus. In this example, user Melling is provided with five pull-down menus. In addition, section 192 includes button 196 ("Log Off") which allows the user to log off of DAMP manager 26.

Section 198 of GUI 190 is a line chart indicative of overall maintenance program progress with hours plotted vertically and days progressing horizontally. Time scale 200, which runs horizontally across section 198, chronologically displays the number of days in the check. Solid horizontal line 202, which is located immediately below time scale 200, represents the currently estimated number of hours required to complete the aircraft maintenance check. Estimate 204, which is displayed beneath solid horizontal line 202, provides a numeric representation of the total number of hours currently estimated to complete the check. Solid horizontal line 206 represents the projected number of hours required to complete the aircraft maintenance check, while forecast 208, which is displayed beneath solid horizontal line 204, provides a numeric representation of the total number of hours projected to complete the check. First broken line 210 represents the planned available labor for the check (as it accrues each day), while second broken line 212 represents the actual labor expended each day on the check. Lines 210 and 212 can be color coded to allow easy differentiation by the airline operator.

The planned day of completion is represented by the intersection of first broken line 210 with solid horizontal line 202. Similarly, the actual day of completion is represented by the intersection of second broken line 212 with solid horizontal line 202. Vertical lines 214 represent milestones in the check. Count 216 indicates the current day of the check, as well as the total number of days planned to complete the check.

Section 218 of GUI 190 (entitled, "Check Status") illustrates, in real-time, the number of work cards ("Count"), the estimated number of hours required ("Estimated Hours"), the actual number of hours applied ("Actual Hours"), and the percentage complete ("% Complete") for various collections of tasks. In the example of GUI 190, tasks are organized by open tasks ("Open"), close tasks ("Close"), and non-estimated tasks ("Non-Estimated"), as well as totals for all tasks ("Total").

Section 220 of GUI 190 is a bar graph indicative of the real-time progress in individual cells (or zones) of aircraft 12. For each cell, the bars graphically illustrates the forecast of when the maintenance check of aircraft 12 will be complete. For example, in cell 1 (the wings zone), bar 222 indicates the number of labor hours that have been applied against that cell, the total bar (formed of bar 222 and bar 224) indicates the total number of hours that have been estimated in that cell, and the number following the total bar indicates the percentage complete of that zone (27% in this example). Similar section 226 (not fully shown) displays a bar graph indicative of the real-time progress by skill type and the total number of mechanics available by skill.

Figure 10:
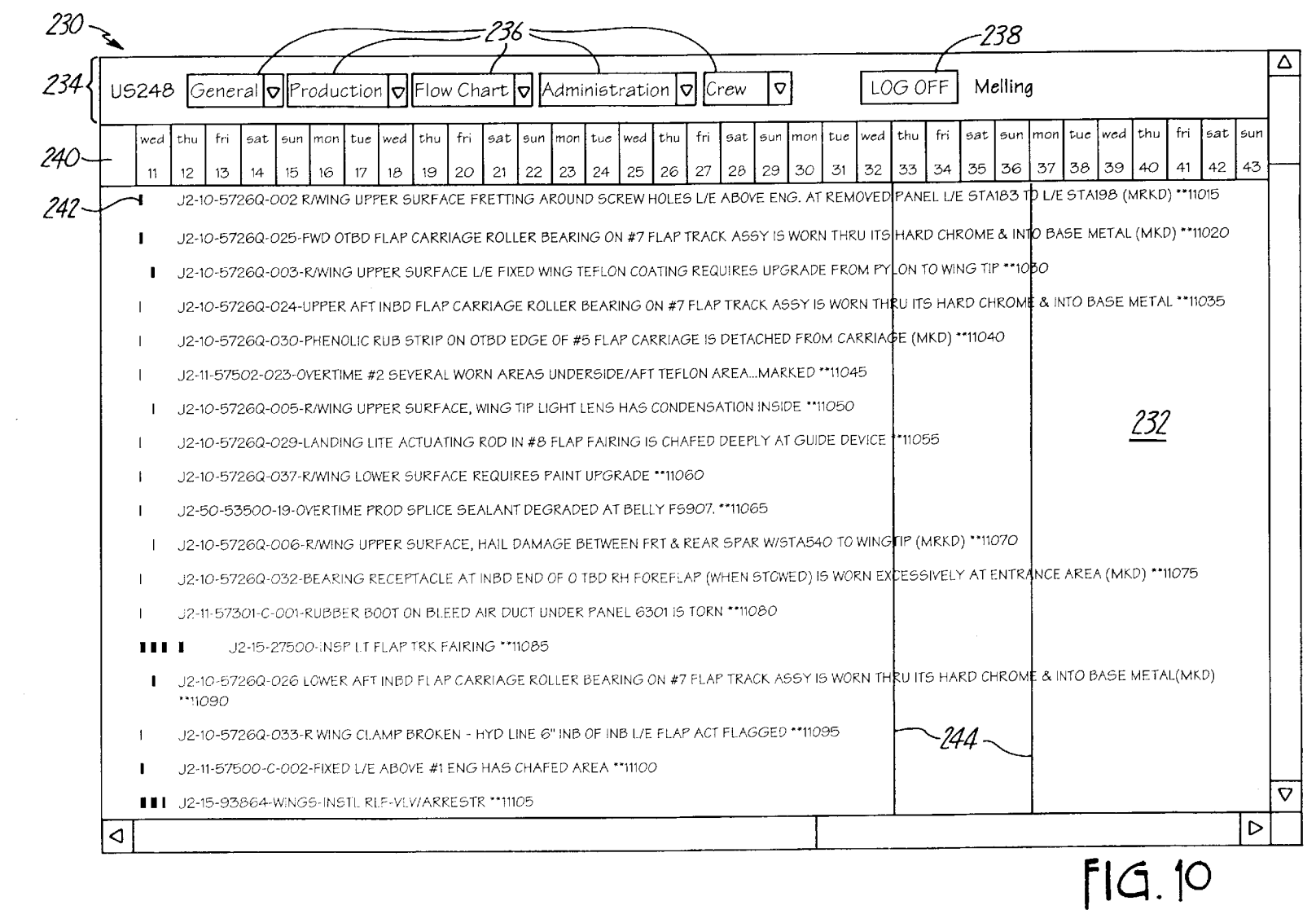

FIG. 10 illustrates example graphical user interface (GUI) 230 used in conjunction with DAMP manager 26 of system

10. GUI 230 includes a dynamic GANTT chart 232 (hereinafter referred to as flow chart 232) indicating the proposed maintenance check flow. Flow chart 232 is designed to pull together all available resources to graphically deliver a dynamic indication of how the check is to proceed if the maintenance plan relating to such variables as task priorities, crew assignments, mechanic availability, task dependancies and task delay is followed. Flow chart 232 is constantly updated to always reflect the most current data.

As in FIG. 9, section 234 of GUI 230 displays the tail number of aircraft 12 (US248) and user name (Melling). Section 234 also includes pull-down menus 236. In addition, section 234 includes button 238 ("Log Off") which allows the user to log off of DAMP manager 26.

Flow chart 232 shows, in real-time, a list of all tasks that are required to be completed during the maintenance check of aircraft 12. Time scale 240 chronologically displays the number of days in the check. In flow chart 232, a width of task bar 242 indicates the time duration of a specific task, while the location of task bar 242 indicates its placement in the overall schedule. As flow chart 232 is dynamically updated, completed tasks will be represented by their actual duration and placement, while incomplete tasks will be represented by their planned duration and placement.

Vertical lines 244 in flow chart 232 represent milestones in the production plan. These milestones are determined by airline management to represent their goals. Vertical lines 244 provide a graphical representation of where the production is in relationship to the milestones. These milestones can also be included in section 198 of GUI 190.

Flow chart 232 can be color-coded to provided a visual cue as to which tasks will fall behind schedule if the current maintenance plan is followed. For instance, completed tasks, tasks presently being worked on, tasks having a scheduled start time that has already elapsed, and future tasks could each be displayed in different colors to allow the airline operator to reallocate resources to get back on track. Flow chart 232 also allows the airline operator to reorder tasks, assign crews, assign dependencies to tasks, and make other decisions in order to avoid missing the check completion date.

FIG. 11a illustrates example graphical user interface (GUI) 250 used in conjunction with DAMP manager 26. GUI 250 is an example crew assignment screen listing tasks assigned to a specific crew working on aircraft 12. Again, section 252 displays information about aircraft 12 and the user, as well as pull-down menus and a log off button. In this example, user "Roche" has access to only two pull-down menus (compared with five in FIG. 9), indicating that user "Roche" has less access to DAMP manager 26 than user "Melling" of FIG. 9.

In GUI 250, tasks are organized according to status. For instance, tasks could be ordered such that top-most tasks have the highest priority, followed sequentially by tasks on hold and non-scheduled tasks. To convey a visual cue as to the urgency of each task, title bar 254 can be colored to indicate the status of the task. Such a visual cue allows the crew lead to better decide how tasks should be assigned.

Title bar 254 details the task identification number, the task description, and other information pertinent to the task. For each task, required skill level 256 ("Mechanic 1" for the first-listed task) is displayed.

To assign a crew member to a task, the user simply checks box 258 under the name of the crew member to whom the task is assigned. Once the task is assigned, the crew member may sign onto the task, at which time the clock starts running on that crew member to collect the total amount of time spent on that task. If a crew member has not logged into DAMP manager 26, a visual cue 260, such as a red square drawn around his corresponding check box 258, may be displayed to instantly alert the user of which employees are absent, whereas a green box could be used to indicate that a crew member is awaiting task assignment. A similar visual cue could be provided if the crew member is in training. This visual signal is helpful because tasks cannot be assigned to crew member who are absent or in training.

In GUI 250, the user can select button 262 ("Work Card") to access a particular task's printable work card for distribution to the crew members. Alternatively, crew members can print their own work cards when checking into DAMP manager 26 to see what tasks have been assigned to them (preferably presented in sequential order of how they should be completed). Not shown in FIG. 11a, GUI 250 can also provide a revise button to allow the user to access a task revision screen for a particular task.

FIG. 11b illustrates example graphical user interface (GUI) 270 used in conjunction with DAMP manager 26 of system 10. GUI 270 is an example crew member assignment screen listing tasks currently assigned to a specific crew member working on aircraft 12. Again, section 272 displays information about aircraft 12 and the user, as well as pull-down menus and a log off button. In this example, user "Albin" (crew member from FIG. 11a) has access to two pull-down menus.

In GUI 270, tasks are organized according to log in status. For instance, tasks could be color-coded such that tasks that the crew member is currently logged in to work on are colored in gray, followed by tasks that the crew member is not currently logged in to work on which are colored in white.

Title line 274 details the task identification number, the task description, and other information pertinent to the task. For each task, the names of the crew members assigned to the task 276 are displayed. The crew member can select button 278 ("Work Card") to access a particular task's printable work card.

Figure 12:
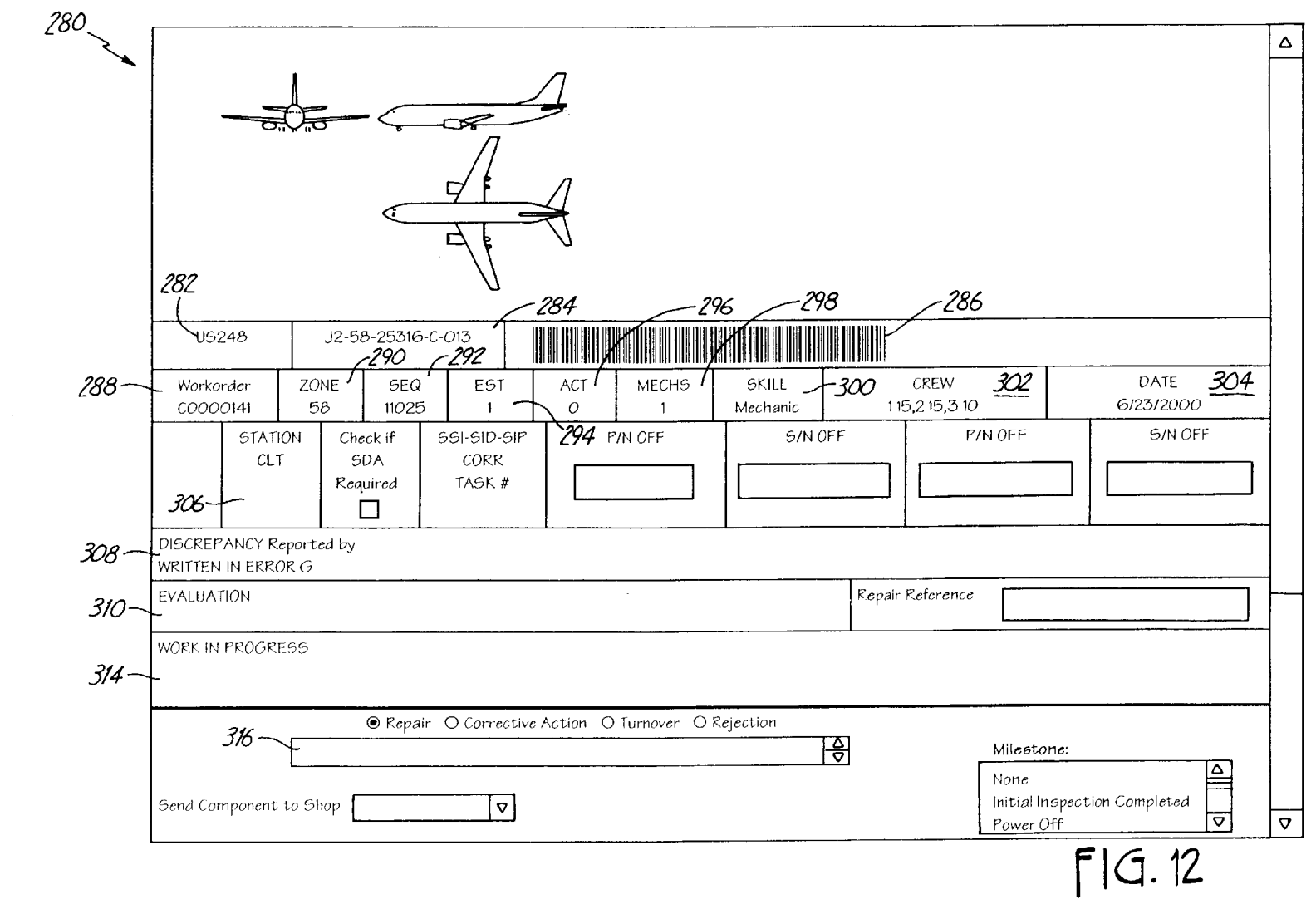

FIG. 12 illustrates example graphical user interface (GUI) 280 used in conjunction with DAMP manager 26 of system 10. GUI 280 is an example work card screen which shows, in real-time, the current status of a selected task. GUI 280 can be accessed in several ways, one of which is the selection of work card button 262 of GUI 250.

GUI 280 presents the following information about the selected task: aircraft tail number 282, task number 284, bar code 286 corresponding to task number 284, work order number 288, zone number 290, sequence number 292, estimated hours 294, actual hours accrued 296, suggested number of crew members 298, skill required 300, crew numbers 302 of crews assigned to task, current date 304, station number 306, and discrepancy or task description 308.

GUI 280 also provides box 310 to enable the assigned mechanic to record evaluation notes, box 312 to enable assigned mechanic to record repair reference, box 314 to enable the assigned mechanic to record work-in-progress notes, and box 316 to enable the assigned mechanic to record notes regarding repair, corrective action, turnover, or rejection. Not shown in FIG. 12, GUI 280 also provides a box to enable the assigned mechanic to sign off on the task, a box to indicate that the task is ready for inspection, and a box to enable the assigned inspector to completely sign off on the task.

To generate a task card, which lists instructions for how a task is to be completed, the user selects a task card button (which is not shown in FIG. 12).

Figure 13:
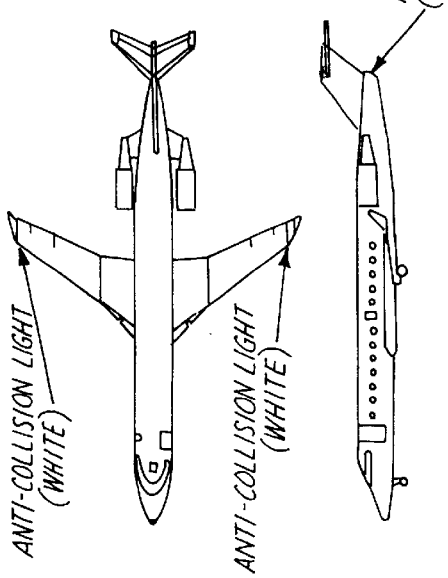

FIG. 13 illustrates example graphical user interface (GUI) 320 used in conjunction with DAMP manager 26 of system 10. GUI 320 is an example task card screen which provides instructions for how a selected task is to be performed. GUI 320 can be accessed in several ways, one of which is the selection of a task card button (which is not shown) of GUI 280.

GUI 320 presents the following information about a selected task: task card number 322, work order number 324, aircraft tail number 326, aircraft serial number 328, accrued flight hours 330, accrued cycles 332, and date 334. GUI 320 also presents a series of steps 336 which provide instructions on how the task is to be performed. In the example illustrated, there are two steps (A and B), with step B having two sub-steps (1 and 2). Columns 338 and 339 indicate what skill types should perform each step. GUI 320 is configured according to the standards of the airline operator for which DAMP manager 26 is designed.

Figure 14:
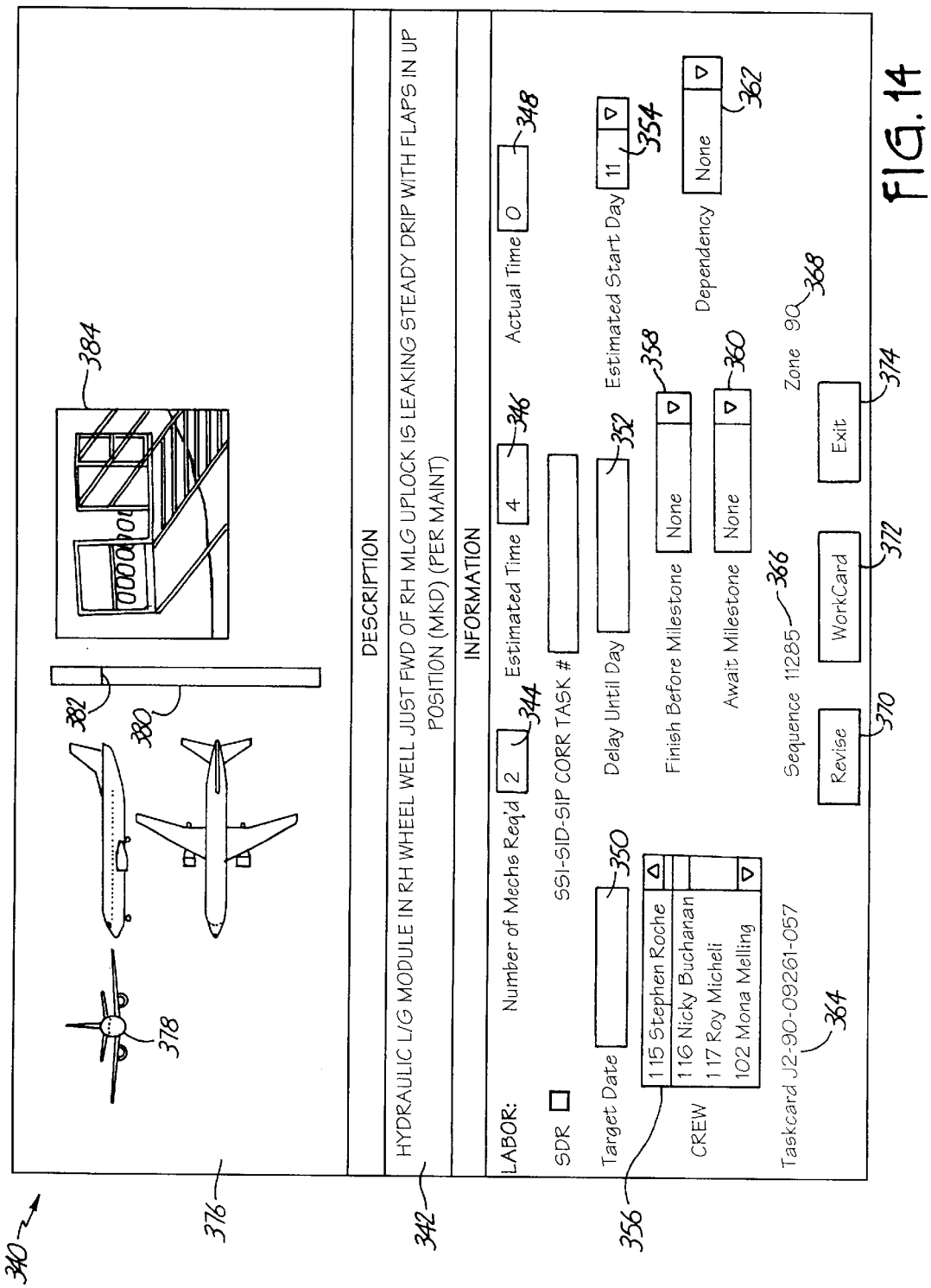

FIG. 14 illustrates example graphical user interface (GUI) 340 used in conjunction with DAMP manager 26 of system 10. GUI 340 is an example task revision screen used to revise information about a specific task. GUI 340 can be accessed in several ways, one of which is the selection of a revise button on GUI 250 (not shown in FIG. 11a).

GUI 340 includes the following real-time information, all of which can be edited in GUI 340: task description 342, number of crew members required 344, estimated time 346, actual time accrued 348, target day for accomplishment 350, delay amount 352, estimated start day 354, assigned crew number 356, milestone the task must precede 358, milestone the task must follow 360, task dependency 362, task card number 364, sequence number 366, and zone number 368.

GUI 340 may be accessed for several reasons. Management may want to revise the number of resources (i.e., number of crew members required 344 and estimated time 346) assigned to a task, or some complication which delays completion of the task. If a task need be delayed, the user can select the number of days the task should be delayed, along a reason for the delay. A user selects button 370 ("Revise") to indicate that the task revision form has been completed, and to enter the new information into the system 10. Button 372 ("Work Card") allows the user to access the work card screen for the task. Button 374 ("Exit") allows the user to exit GUI 340.

Section 376 of GUI 340 visually indicates (preferably by a color-coded dot 378 or an arrow) the location on aircraft 12 where the selected task is targeted. Photograph 384 of the task location is also provided. GUI 340 also indicates, in real-time, where this task falls in the overall production plan. Combined, bar graph 380 and indicator mark 382 represent the current priority of the selected task in relation to all the other maintenance tasks within the check. The priority of the task can be increased by sliding indicator mark 382 toward the top of bar graph 380. Conversely, the priority of the task can be decreased by sliding indicator mark 382 toward the bottom of bar graph 380. A similar bar graph and indicator mark can also be provided to indicate where in the current overall status of the maintenance check the task lies.

Figure 15:
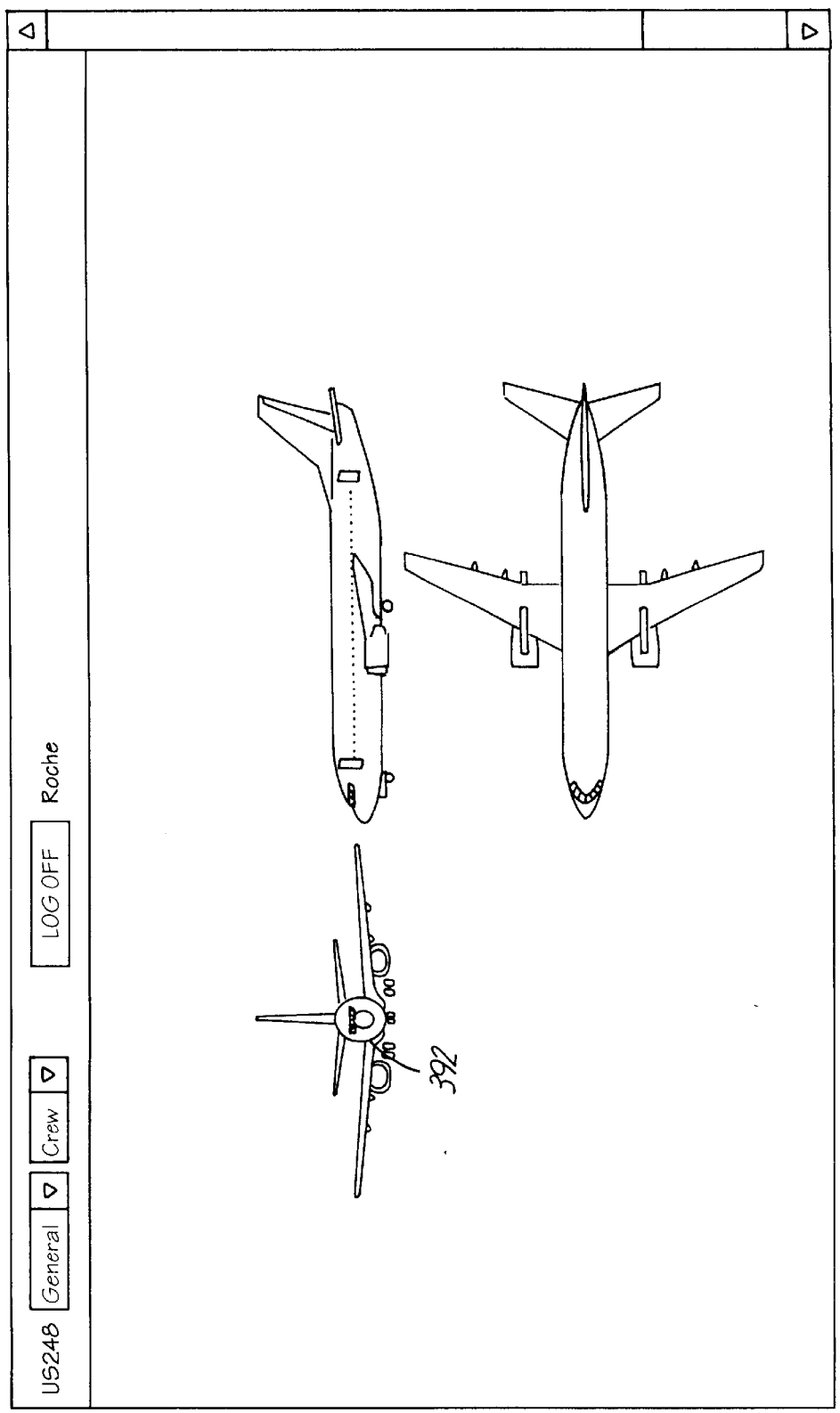

FIG. 15 illustrates example graphical user interface (GUI) 390 used in conjunction with DAMP manager 26 of system 10. GUI 390 is an example work locations screen of system 10. GUI 390 presents a graphical image of aircraft 12 (from three different perspectives) and dots to identify where on aircraft 12 maintenance needs to be performed. As a user moves the cursor over selected dot 392, a roll-over description of the maintenance task can be provided. The user can click on dot 392 to access the work card screen for that particular maintenance task.

Figure 16:
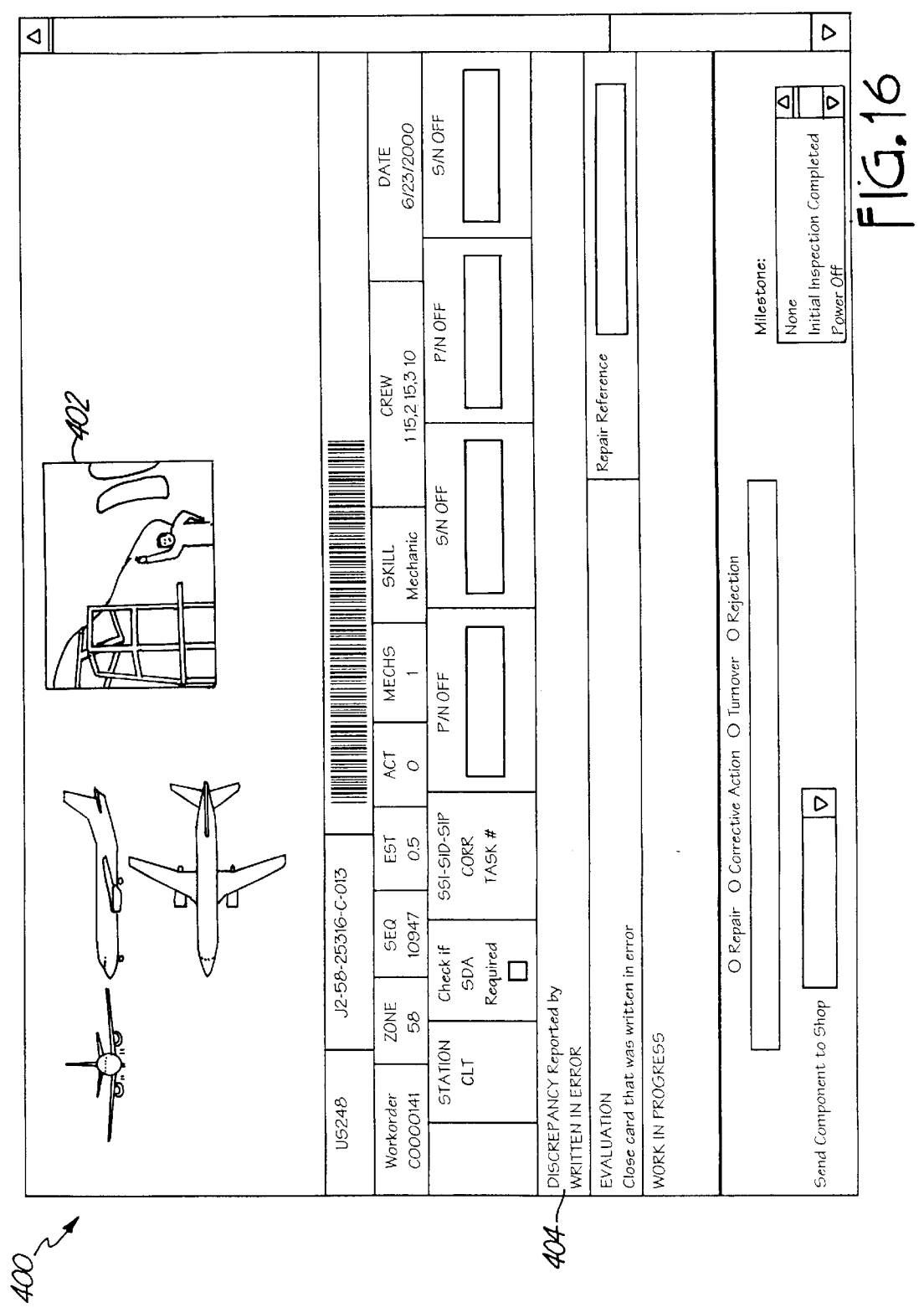

FIG. 16 illustrates example graphical user interface (GUI) 400 used in conjunction with DAMP manager 26 of system 10. GUI 400 is an example work card screen for a non-routine task. GUI 400 is essentially identical to GUI 280 (work card screen for a routine task), except that GUI 400 includes photograph 402 of reported discrepancy 404.

FIG. 17 illustrates example graphical user interface (GUI) 410 used in conjunction with DAMP manager 26 of system 10. GUI 410 is an example "Task Re-Evaluation" shift end screen. Section 412 displays information about aircraft 12 and the user, as well as pull-down menus and a log off button.

Section 414 of GUI 410 lists all tasks having more hours applied to them than last estimated. Column 416 lists the task number and description of each task, column 418 lists the estimated number of hours to complete that task, column 420 lists the actual hours accrued (so far) to that task, column 422 provides a box in which the crew lead can supply a new estimate of the time remaining on that task, and column 424 provides the crew numbers of crews assigned to that task.

Section 426 of GUI 410 provides a tool to log crew members out of DAMP manager 26. To log a specific crew member off, the user need only check box 428 located beneath the crew member's name, and then select button 430 ("Sign Out").

Reliability Manager

Upon completion of a heavy maintenance period, reliability manager 28 records data relating to reliability of individual aircraft parts. The airline's reliability board may later use reliability manager 28 to query the reliability data and generate reports useful for recommending changes to the MRB program.

Reliability manager collects information about non-routine tasks. Tracking manager 24 links each non-routine task to its generating routine task to allow reliability manager 28 to determine whether a maintenance interval for a part can be accelerated, or if it needs to be decelerated.

Reliability manager 28 also collects all the information regarding rotable parts (those parts which can be repaired) including when they were installed, when they were removed, what were the non-routine tasks performed in their life cycle, when they came in for line maintenance checks and their parent-child relationship with other rotable parts. Reliability manager 28 allows airlines to evaluate whether or not a rotable part is actually meeting the manufacturer's predicted life limits. In addition, reliability manager 28 analyzes the maintenance program produced by MRB program manager 22 and the maintenance logbook produced by tracking manager 24 to analyze the reliability of each rotable part. If a rotable part never has a deficiency within the suggested inspection interval, the airline may modify its maintenance program based upon the reliability data produced by reliability manager 28.

The primary purpose of an MRB document is to assist the regulatory authorities in determining the initial scheduled maintenance requirements for new or derivative types of transport-category aircraft. The MRB document is used as the basis from which an airline develops its own continuous airworthiness maintenance program. Any change to the maintenance program requires an analysis phase and an appropriate sampling of aircraft reliability data. The resulting information serves as justification for any modifications to the airline's maintenance program.

A reliability program establishes the time limitations or standards for determining intervals between overhauls, inspections and checks of aircraft equipment. Guidance on reliability program elements is listed in Advisory Circular (AC) 120-17, Maintenance Program Management Through Reliability Methods, as amended, the Airline/Manufacturer Maintenance Program Planning Document, MSG-2/3, and/or Maintenance Tasks. A reliability program typically collects reliability data from sources including unscheduled removals of parts, confirmed failures of parts, pilot reports, sampling inspections, shop findings, functional checks, bench checks, service difficulty reports, mechanical interruption summaries and other sources the airline considers appropriate.

Electronic Publications Manager

Electronic publications manager 30 is a tool which gathers the multitude of publications needed in the aircraft maintenance industry, and provides them in an on-line environment.

The airline maintenance industry is a highly regulated industry which produces a substantial number of disparate publications essential for operation of an airline maintenance facility. Electronic publications manager 30 is a tool that gathers this multitude of publications into an electronic form, thus making the publications more easily accessible to aircraft maintenance personnel.

Electronic publications manager 30 works cooperatively with MRB program manager 22, tracking manager 24 and DAMP manager 26 to provide access to needed documents as needed by maintenance personnel.

Electronic publications manager 30 stores such publications as training manuals, maintenance manuals, illustrated parts catalogs, structural repair manuals, aircraft wiring diagram manuals, FAA directives and an airline's specific general engineering and maintenance manual.

Electronic publications manager 30 can work with the other components of system 10 to instantly link each task in the maintenance program to work cards, which explain an airline's preferred method of performing that task, or may include photographs or wiring diagrams helpful to performing the task.

Personnel Training Manager

Personnel training manager 32 provides tools for an airline operator to assign instructors, students, classrooms and audio visual equipment to specific training courses. Personnel training manager 32 further provides access from DAMP manager 26 to personnel training records 16 to enable an airline to know exactly when and what training its employees need.

Personnel training manager 32 provides tools for an airline to assign instructors, students, classrooms and audio visual equipment to specific courses. Personnel training manager 32 further provides access to personnel training records 16 to enable an airline to know exactly when and what training its employees need.

Personnel training manager 32 allows an airline to organize personnel training records 16 in a variety of formats, including lists of those individuals requiring recurrent training in a specific course, those individuals who are scheduled for training within a specified period of time, those individuals who require recurrent training in a specific course, those individuals who require recurrent training in all courses, those individuals who are scheduled for training within a specified time frame, those courses that are currently scheduled (along with corresponding instructors and trainees) and those classrooms that are available.

As training occurs, personnel training manager 32 supplements personnel training records 16 to incorporate information regarding training each employee receives, thereby keeping personnel records 16 up-to-date. Personnel training manager 32 keeps track of both classroom training and on-the-job training.

In addition, personnel training manager 32 compares personnel training records 16 with FAA training requirements 18 to monitor which tasks each employee is qualified to perform. By integrating personnel training manager 32 with DAMP manager 26, crew leads can quickly ascertain which mechanics have the training necessary to perform specific tasks, there by ensuring that only qualified mechanics are assigned to tasks. The FAA has very strict standards regarding the training required of aircraft mechanics. Before a mechanic can independently perform a task, the FAA requires that the mechanic have either been previously supervised performing the task or been specifically trained for that task.

Another advantage of integrating personnel training manager 32 with DAMP manager 26, is that employees, as well as maintenance management, are instantly notified of the employee's training schedule.

Additionally, as employees are scheduled off the floor for training, DAMP manager 26 instantaneously makes adjustments to the number of employee hours available to complete maintenance of an aircraft. Thus, the production coordinator can immediately ascertain the effect of removing those employees from the work floor, and will be able to plan the maintenance production accordingly. If the production schedule is negatively affected by the training (i.e., one or more days are added to the production schedule), the production planner may schedule some personnel to work overtime or shift personnel in from other maintenance bays to make up the missing production hours. A production coordinator may also consult with training personnel to reschedule the training to minimize harm to the production schedule (e.g., perhaps only six of twelve employees scheduled for training will actually attend the training). Effectively, the management team is given early options to control its production schedule.

Automatic Assignment of Employees

As mentioned in reference to step 170 of FIG. 8, DAMP manager 26 can integrate with personnel training manager 32 to automatically assign employees to tasks. DAMP manager 26 prioritizes the tasks within the maintenance program, analyzes data regarding training of employees (gained from personnel training manager 32), and assigns the best mechanic to the job.

Figure 18:
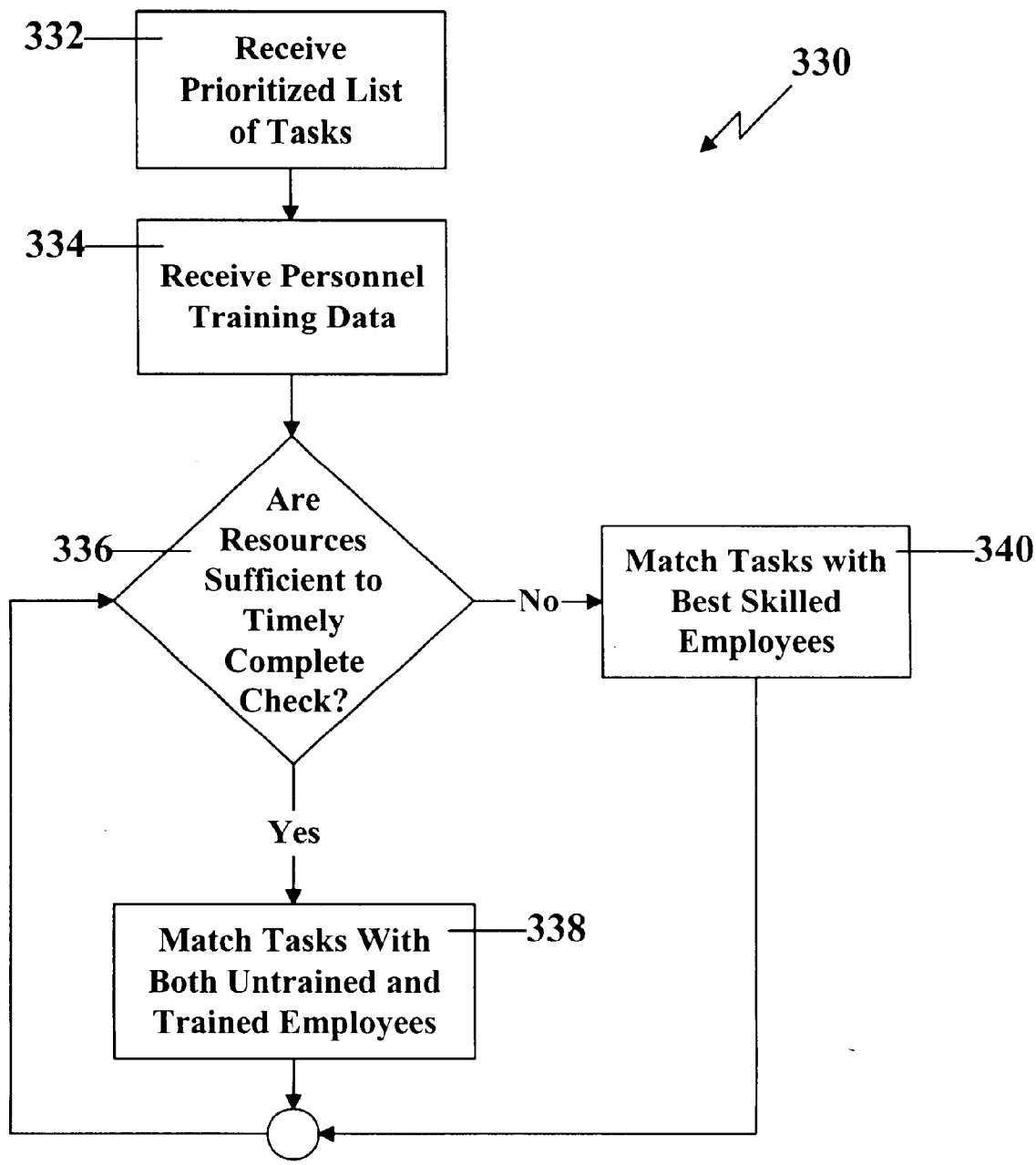
FIG. 18 is a flow diagram of an automatic task assignment component of the DAMP manager component of the system of FIG. 1.

FIG. 18 is a flow diagram of the automatic task assignment component of DAMP manager 26. At step 332, the auto-assign system receives a prioritized list of tasks to be accomplished in one to two days, and at step 334, the auto-assign system receives personnel training data from personnel training manager 32. At step 336, the auto-assign system compares the available resources to the need resources to timely complete the maintenance check. If there is enough time and enough mechanics to enable the completion of all necessary tasks within the necessary time period, the auto-assign system will enter a training mode. In this training mode, at step 338, DAMP manager 26 will assign to specific tasks, when possible, those mechanics who need on the job training along with a mechanic who has the necessary training. To enable this automatic training function, DAMP manager 26 analyzes the maintenance flow of the aircraft, how much maintenance time is remaining, how many tasks need to be accomplished, how many mechanics are scheduled to work and personnel training records 16.

DAMP manager 26 continues to monitor the maintenance flow during production. If maintenance flow falls behind schedule, the automatic assignment of tasks will switch from a training mode to a best skilled mode. In this mode, at step 340, each task is assigned the best skilled employee(s) to ensure the timely completion of the maintenance check. If the available resources become sufficient at anytime during the check, the auto-assign system can switch back to the training mode. Additionally, this automatic assignment of employees can be overwritten by crew leads or production management at any time.

Implementation

According to the present invention, a system and method are provided for dynamically managing, in real-time, aircraft maintenance requirements. The system and method of the present invention brings a distributed computing framework of using client/server and Internet technologies to the field of aircraft maintenance, allowing end-users to react quickly to the dynamics of everyday events. The system and method of the present invention take advantage of a process of using the Internet browser technology to deliver real-time distributed software products for the aircraft maintenance industry.

Applications

The airline industry is formed of four tiers of airline operators: the major airlines, the regional airlines, the corporate owners of small fleets of aircraft and the individual (or private) owners of aircraft. Each of these tiers of operators has need for some-scaled version of system 10 of the present invention. Certainly, an individual owner of a single aircraft will have different needs that a multiple-hubbed major aircraft operator of a large fleet of aircraft. Nonetheless, each of the above-described components of system 10 has applicability to each tier of aircraft operators.

Application to Major Airlines

Major airlines typically operate a large and varying fleet of passenger aircraft. These operators generally fly into a large number of cities, with maintenance potentially occurring in any of those cities, and heavy maintenance bases in several of those cities. The major airlines stand to lose a substantial amount of revenue each day one of its aircraft is grounded due to maintenance. Therefore, one of the main priorities for the major airline is to minimize the number of days that its aircraft remain in heavy maintenance (without sacrificing the airworthiness of the aircraft) by efficiently managing the completion of tasks during heavy maintenance periods. For that reason, DAMP manager 26 is likely the most important component of a major airline's maintenance management program. Similarly, personnel training manager 32 aids the airline in ensuring that their maintenance personnel are training Application to Regional Airlines Regional airlines will typically operate a much smaller fleet of aircraft than the major airlines, with less variety in the type of aircraft. Additionally, the aircraft owned by the regional airlines tend to be smaller than those owned by the major airlines, and tend to require fewer maintenance tasks to keep them airworthy. Because of the smaller scale of the regional airlines, they do not have the same manpower and resources of the major airlines to create individualized maintenance programs. Thus, the regional airlines tend to be more concerned with simply gathering all of the information about their maintenance program in one place. For that reason, MRB program manager 22 and tracking manager 24 are likely the most important components of a regional airline's maintenance management program. MRB program manager 22 and tracking manager 24 will provide the regional airlines with the tools needed to organize their maintenance tasks into logical groupings, and to monitor those tasks for when they are due.

At the regional airlines, reliability analysis also suffers due to the limited resources available to the regional airlines. A reliability program to monitor warranty issues and MRB document modifications is a particularly complicated (and expensive) program to implement. Such a program simply requires a large number of resources (typically personnel) to gather and analyze the large amount of data needed to (1) establish individual parts have met manufacturer's warranty, and (2) meet the FAA regulations for modifying one's MRB document. Thus, reliability manager 28 can be another key component to add to their maintenance management system.

Application to a General or Corporate Aviation Environment

Corporate and general aviation aircraft operators typically own one to five aircraft. Often, the aircraft owned by corporate and individual operators do not have MRB maintenance documents associated with them, but only a maintenance manual supplied by the aircraft manufacturer. In lieu of an MRB maintenance document, the tasks and suggested performance intervals listed in the maintenance manual can loaded into MRB program manager 22 to create a well-organized maintenance program, and into tracking manager 24 to track the tasks listed in the maintenance manual.

Summary

The system and method of the present invention is a software system designed for the multiple users of a production coordination system within the aircraft maintenance industry. It allows mechanics to understand exactly what routine and non-routine items they are to work on, it allows the crew leads to assign tasks to crew members and query as to what tasks are currently being worked on and by whom, and it provides the managers the opportunity to compare actual time expended on aircraft compared to forecasted time and to adjust crew priorities in real-time. Crew leads, managers and executive management can quickly evaluate where the aircraft is in relation to the forecasted time of the aircraft check as to percentage complete and estimated time of completion visually by the use of easy-to-understand charts.

Although the present invention has been described with reference to preferred embodiments, workers skilled in the art will recognize that changes may be made in form and detail without departing from the spirit and scope of the invention.

What is claimed is:

1. A method for dynamically planning a maintenance check of an aircraft, the method comprising:

obtaining any routine tasks that may exist, and which are required to be performed on the aircraft;

obtaining any non-routine tasks that may exist, and which are required to be performed on the aircraft;

generating a maintenance flow chart detailing scheduling data for each of the routine and non-routine tasks;

assigning a user-determined number of the routine and non-routine tasks to personnel for completion;

obtaining maintenance activity data on each assigned routine task and non-routine task;

obtaining available resource data; and updating the maintenance flow chart to reflect newly-obtained maintenance activity data and available resource data.

2. The method of claim 1 wherein obtaining any routine tasks comprises extracting, from a Maintenance Review Board document, a list of routine tasks required to be performed on the aircraft.

3. The method of claim 1 wherein the obtained non-routine tasks are a result of the performance of routine tasks by inspection and maintenance personnel.

4. The method of claim 1 wherein the scheduling data comprises:

a project forecast of an amount of time required to complete the maintenance check;

a start time and an execution time for each of the obtained routine and non-routine tasks, wherein the start and execution times are estimated values for incomplete tasks and are actual values for completed tasks.

5. The method of claim 1 wherein generating a maintenance flow chart comprises:

identifying any dependent tasks that may exist, the dependent tasks being those routine and non-routine tasks which cannot be performed until the completion of at least one of the routine and non-routine tasks; and generating a maintenance flow chart in which no dependent task has a start time earlier than an end time of any of the routine and non-routine tasks from which the dependent task depends.

6. The method of claim 1 wherein generating a maintenance flow chart comprises:

generating a proposed maintenance flow chart;

obtaining planning personnel modifications to the proposed maintenance flow chart; and generating a maintenance flow chart which incorporates the planning personnel modifications.

7. The method of claim 1 wherein assigning a user-determined number of routine and non-routine tasks to personnel for completion comprises obtaining assignment information from maintenance personnel.

8. The method of claim 1 wherein obtaining maintenance activity data on each assigned routine and non-routine task comprises obtaining a start time and an execution time for each assigned routine and non-routine task, the start time being a time at the task was assigned and the execution time being an elapsed amount of time spent completing the task.

9. The method of claim 1 wherein obtaining maintenance activity data on each assigned routine and non-routine task comprises obtaining new estimated execution times for those incomplete routine and non-routine tasks for which an actual execution time exceeds an initially-estimated execution time.

10. The method of claim 1 wherein obtaining maintenance activity data on each assigned routine and non-routine task comprises obtaining pass-down notes from an assigned personnel member for those routine and non-routine tasks left incomplete by the assigned personnel member.

11. The method of claim 1 wherein the available resource data comprises labor hours available.

12. The method of claim 1 wherein maintenance flow chart is graphically represented via a GANTT chart.

13. The method of claim 1 wherein the method is operated over a communication medium operably connected to a plurality of input/output devices each having means for inputting and outputting information.

14. The method of claim 13 wherein the communication medium is the digital communication network.

15. A dynamic aircraft maintenance production system for planning a maintenance check of an aircraft, the dynamic aircraft production system comprising:

means for obtaining any routine tasks that may exist, and which are required to be performed on the aircraft;

means for obtaining any non-routine tasks that may exist, and which are required to be performed on the aircraft;

means for generating a maintenance flow chart detailing scheduling data for each of the routine and non-routine tasks;

means for assigning a user-determined number of the routine and non-routine tasks to personnel for completion;

means for obtaining maintenance activity data on each assigned routine task and non-routine task;

means for obtaining available resource data; and means for updating the maintenance flow chart to reflect newly-obtained maintenance activity data and available resource data.

16. The dynamic aircraft maintenance production system of claim 15 wherein the means for obtaining any routine tasks comprises means for extracting, from a Maintenance Review Board document, a list of routine tasks required to be performed on the aircraft.

17. The dynamic aircraft maintenance production system of claim 15 wherein the obtained non-routine tasks result from the performance of routine tasks by inspection and maintenance personnel.

18. The dynamic aircraft maintenance production system of claim 15 wherein the scheduling data comprises:

a project forecast of an amount of time required to complete the maintenance check;

a start time and an execution time for each of the obtained routine and non-routine tasks, wherein the start and execution times are estimated values for incomplete tasks and are actual values for completed tasks.

19. The dynamic aircraft maintenance production system of claim 15 wherein the means for generating a maintenance flow chart comprises means for identifying any dependent tasks that may exist, the dependent tasks being those routine and non-routine tasks which cannot be performed until the completion of at least one of the routine and non-routine tasks; and means for generating a maintenance flow chart in which no dependent task has a start time earlier than an end time of any of the routine and non-routine tasks from which the dependent task depends.

20. The dynamic aircraft maintenance production system of claim 15 wherein the means for generating a maintenance flow chart comprises:

means for generating a proposed maintenance flow chart;

means for obtaining planning personnel modifications to the proposed maintenance flow chart; and means for generating a maintenance flow chart which incorporates the planning personnel modifications.

21. The dynamic aircraft maintenance production system of claim 15 wherein the means for assigning a user-determined number of routine and non-routine tasks to personnel for completion comprises means for obtaining assignment information from maintenance personnel.

22. The dynamic aircraft maintenance production system of claim 15 wherein the means for obtaining maintenance activity data on each assigned routine and non-routine task comprises means for obtaining a start time and an execution time for each assigned routine and non-routine task, the start time being a time at the task was assigned and the execution time being an elapsed amount of time spent completing the task.

23. The dynamic aircraft maintenance production system of claim 15 wherein the means for obtaining maintenance activity data on each assigned routine and non-routine task comprises means for obtaining new estimated execution times for those incomplete routine and non-routine tasks for which an actual execution time exceeds an initially-estimated execution time.

24. The dynamic aircraft maintenance production system of claim 15 wherein obtaining maintenance activity data on each assigned routine and non-routine task comprises means for obtaining pass-down notes from an assigned personnel member for those routine and non-routine tasks left incomplete by the assigned personnel member.

25. The dynamic aircraft maintenance production system of claim 15 wherein the available resource data comprises labor hours available.

26. The dynamic aircraft maintenance production system of claim 15 wherein maintenance flow chart is graphically represented via a GANTT chart.

27. The dynamic aircraft maintenance production system of claim 15 wherein the dynamic aircraft production system is implemented over a communication medium operably connected to a plurality of input/output devices each having means for inputting and outputting information.

28. The dynamic aircraft maintenance production system of claim 27 wherein the communication medium is a digital communications network.

* * * * *